United States Patent [19]

Housel, III

[11] Patent Number: 5,339,421

[45] Date of Patent: Aug. 16, 1994

[54] GENERAL DATA STREAM PARSER FOR ENCODING AND DECODING DATA AND PROGRAM INTERFACE FOR SAME

[75] Inventor: Barron C. Housel, III, Chapel Hill, N.C.

[73] Assignee: International Business Machines Corporation, Armonk, N.Y.

[21] Appl. No.: 673,439

[22] Filed: Mar. 22, 1991

[51] Int. Cl.⁵ .............................................. G06F 7/10
[52] U.S. Cl. .................................. 395/700; 395/425; 395/725; 395/275; 395/500; 364/246; 364/DIG. 1
[58] Field of Search .................... 341/67; 364/DIG. 1, 364/DIG. 2; 395/700, 425, 725, 275, 500

[56] References Cited

U.S. PATENT DOCUMENTS

| | | | |
|---|---|---|---|
| 5,016,009 | 5/1991 | Whiting et al. | 341/67 |
| 5,023,610 | 6/1991 | Rubow et al. | 341/51 |
| 5,097,533 | 3/1992 | Burger et al. | 395/500 |
| 5,146,221 | 9/1992 | Whiting et al. | 341/67 |

Primary Examiner—Thomas C. Lee
Assistant Examiner—Michael A. Oblon
Attorney, Agent, or Firm—Jerry W. Herndon

[57] ABSTRACT

A common general parser and applications program interface for use in a data processing system. The parser encodes data from a program for transmission onto a channel and decodes incoming data for handoff to an applications program. Initialization of the parser includes allocating private storage for the individual data items to be encoded or decoded. The program requests data that is received by the parser or transmits data onto the channel by issuing a call to the parser. The call identifies the parse table to be used by the parser. In response, the parser encodes of decodes the data in accordance with the identified parse table to extract the individual data items. The parser stores the individual data items in their respective allocated storage areas for the program during decoding or extracts the data items from the storage for encoding.

7 Claims, 14 Drawing Sheets

FIG. 19

| BYTE NO. → | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| CHAR | . | . | . | . | C | O | M | P | U | T | E | R | S | . | . | . | . | S | N | A | |
| HEX | 00 | 0D | 00 | A1 | C3 | 96 | 94 | 97 | A4 | A3 | 85 | 99 | A2 | 00 | 10 | 00 | B2 | E2 | D5 | C1 | 40 |

| BYTE NO. → | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|
| | N | E | T | W | O | R | K | S | . | . | . | . | . | I | E | E | E | . | A | C | M |
| | D5 | 85 | A3 | A6 | 96 | 99 | 92 | A2 | 00 | 00 | 00 | 09 | 04 | C9 | C5 | C5 | C5 | 03 | C1 | C3 | D6 |

GENERAL DATA STREAM PARSER FOR ENCODING AND DECODING DATA AND PROGRAM INTERFACE FOR SAME

TECHNICAL FIELD

The invention generally relates to the field of data processing and particularly to algorithms and methods for the transmission and reception of data streams having diverse data formats. The invention further relates to the interface between application programs that wish to send and receive such data streams and the services provided by a general data stream parser.

BACKGROUND OF THE INVENTION

Many software communication products and applications have the requirement to encode (build) and decode (interpret) complex, self-defining data streams. In network and device communications, data stream architecture refers to the format that is used to assemble various data items for transmission and reception via a communications network or data channel. There are many such data architectures. In general, the format of data incoming or outgoing from a given application, program or data channel is dependent on the type of data pertinent to the particular application, program or device connected to the data channel. For System Network Architecture (SNA) services, for example, different types of data architectures are associated with SNA products such as Distribution Services (SNA/DS), Document Interchange Architecture (DIA), and Communications and Systems Management (CSM). There are many other examples. Different types of data architectures for different services usually occur because of the particular requirements of the services and to minimize the number of bytes to be transported for each of the different services, while at the same time allowing flexibility for future changes and additions.

When information needs to be transmitted, data elements of interest must be assembled in a linear sequence that conforms to the data stream architecture. This process is called encoding. Conversely, when a data stream arrives at its destination, the data stream must be analyzed and the data items extracted and converted to a form that is useful to the associated application or software. This process is called decoding. The term parsing refers to the processes that are required to accomplish the encoding and decoding. For different data stream architectures, of course, different parsing logic is required. Presently, software developers typically implement individual parsing procedures within a data processing system or node to encode and decode the different types of data streams that might be encountered. For example, the data streams (types of data items and their ordering) would typically be quite different for a payroll software application as contrasted with that for a magnetic storage medium, such as a harddisk. Additionally, these individual parsing procedures typically receive from or pass data to an application, or the like, serially as the data is received. This requires that the applications, etc. be aware of the data stream format that is used to interpret the data properly.

The implementation of many individual parsing procedures within a single system to accommodate different data stream architectures is costly and inefficient in terms of design, maintenance and consumption of system resources. It would be beneficial if a single, general data stream parser could be designed. In addition, an interface structure between such a parser and the using applications is needed to shelter the applications from the burden of having to know detailed information regarding the data stream format in use.

SUMMARY OF THE INVENTION

The invention is a common general parser and applications program interface for use in a data processing system. The system includes at least one processing node with a data communications channel. The parser encodes data from a program for transmission onto the channel and decodes incoming data for handoff to an applications program. For data incoming on the channel, this instance of communication between the parser and the program is initialized. The initialization includes identifying a parse table which defines the format of individual items of data in the data stream corresponding to templates defined within the parse table. The initialization also includes allocating private storage for the individual data items. Thereafter, the program requests a templates worth of data that is received by the parser on the channel by issuing a call to the parser. The call identifies the parse table to be used by the parser. In response, the parser decodes the incoming data in accordance with the identified parse table to extract the individual data items. The parser stores the individual data items in their respective allocated storage areas for the program and then transfers control to the program until called for the next set of data items.

In accordance with the above summary, this invention describes a general table-driven method that allows the convenient and common encoding and decoding of many types of data streams. A parse table describes the structure and layout of a given data stream. An application program issues calls to a common parser, which uses a parse table to either encode an output data stream or to decode an input data stream and pass the data to the application using the tables generated for the desired data stream. The construction and interpretation of entities such as length fields, syntactic identifiers (code points), and delimiters can be totally hidden from the an application, if desired. Mapping data items and user exits allows the designer to specify the source/target formats for data items that are passed between the application and the parser. Alternatively, a user exit may be specified to handle individual data items that are to be constructed or interpreted.

Using the applications program interface (API) of the invention, an application program can pass data to or receive data from the parser in a fashion similar to that of a programmer using high-level language statements, such as the FORMAT statement in FORTRAN. The API permits applications to be shielded from the data stream complexity. Details such as computing length fields and inserting the code points required for self-defining data streams are handled automatically by the parser. The API allows data to be passed to/from the parser in a format that is most convenient for the application. For example, the interface options permit features such as moving data to application-specified and structured data areas, padding of variable length fields with blanks, and the presentation of fields in a specified order (regardless of their order in the data stream). During an encoding phase, the encoder automatically constructs fields and during the decoding phase, the decoder interprets fields and discards them if they are not of interest to the calling application. An assertion facility within the parser allows testing for valid conditions that must occur at a certain stage of a parse. Testing for nested and repeating structures can be built into the parse tables as well as "look-ahead" functions that allow the parser to look ahead in the data stream to determine the next descriptor that should be used. Complex expressions can be coded to specify existence or validation criteria of fields.

BRIEF DESCRIPTION OF THE DRAWING

In the drawing,

FIG. 19 shows a specific encoding example related to the general stream of FIG. 18.

DETAILED DESCRIPTION

Figure 1:
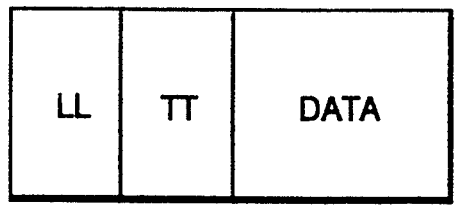
FIGS. 1 through 7 show a number of illustrative data stream formats as examples of the different types of data streams that can be encountered in practice and to which the invention can be applied.
Figure 2:
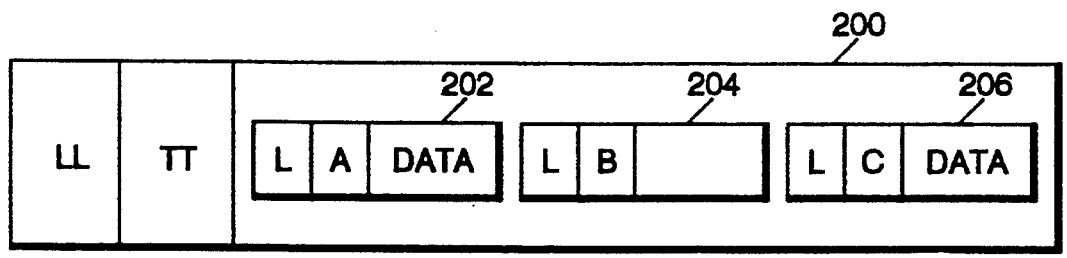
Figure 3:
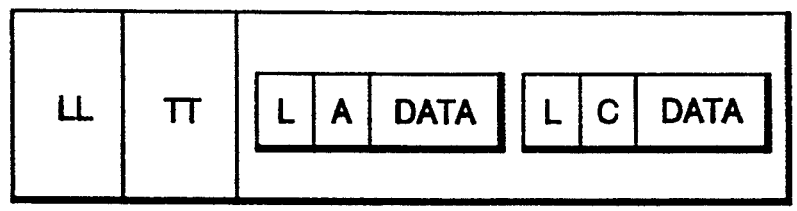
Figure 4:
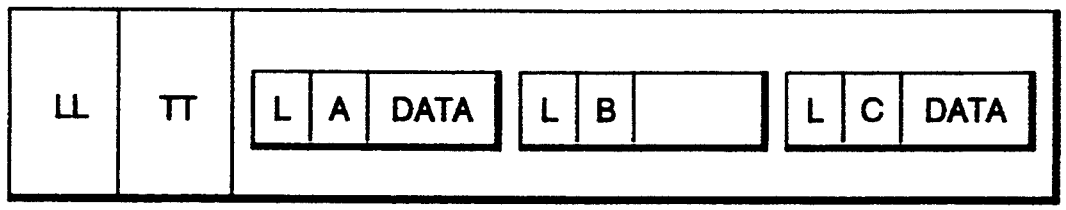
Figure 5:
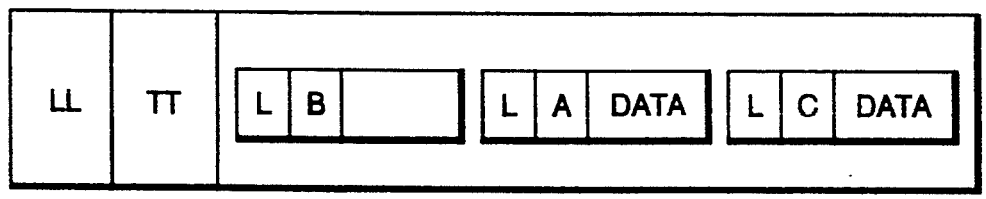
Figure 6:
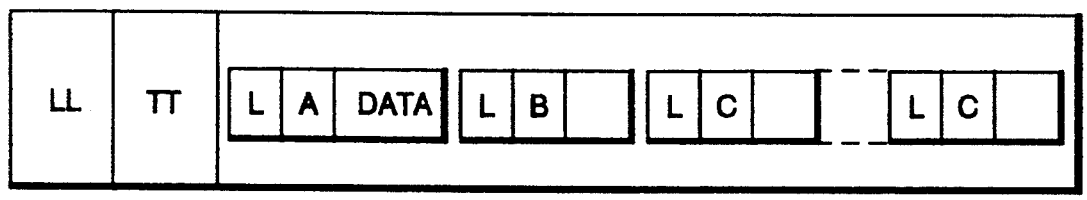
Figure 7:
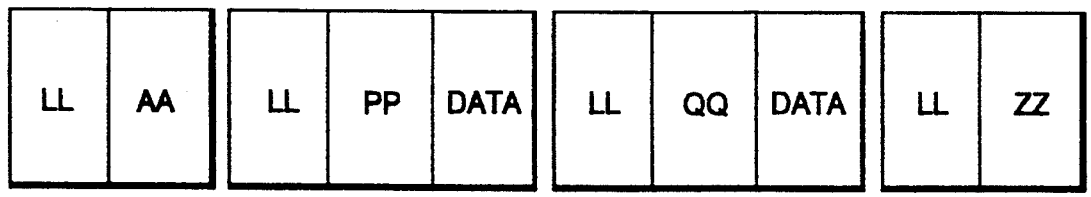

FIGS. 1 through 7 show illustrative examples of some different types of data stream formats that might be encountered in a typical data processing system. One characteristic of these data streams is that they are "self-defining." That is, some of the data items themselves define the format of the stream. For example, elements of the data stream might begin with a one or two byte length field ("L" or "LL") followed by a one or two byte code or type identifier ("T" or "TT") that serve to uniquely identify the information that follows. The information so identified may itself be selfdefining, and so on in a nested fashion. FIG. 1 shows a simple format consisting of a two-byte length (LL) field, followed by a two-byte type identifier field (TT). The information in the DATA field forms one data item of length LL minus 4. Here and in the following examples, L and T indicate one byte fields, whereas LL and TT, etc. illustrate two byte fields, and so on. FIG. 2 illustrates an imbedded type of data stream in which an overall item 200 of length LL and type TT contains imbedded items 202, 204 and 206, each with a one byte length and type values of A, B, and C, respectively, occurring in sequence. FIG. 3 shows a stream format similar to FIG. 2, but in which item type "B" is optional, i.e., may or may not occur in any particular stream of that architecture. In other formats, data items such as type A, B, C might be allowed to occur in any order. In FIG. 4, their order of occurrence is A, B, C. However, in FIG. 5, their order of occurrence is B, A, C. In some data streams, some data items might be allowed to repeat. This is illustrated in FIG. 6, where items of type "C" may occur repeatedly in sequence. FIG. 7 illustrates a format in which the individual data items are described by length bytes LL, but the beginning and end of a data record is offset by the delimiters LLAA and LLZZ. Here, an item with type AA begins a record and the item with type ZZ terminates the record.

The above are only examples of the many types of data stream architectures that one might need to accommodate. Many other types of formats are possible. For example, in some formats the interpretation of a data stream might be dependent on the values of items that have previously been decoded in the stream.

Figure 8:
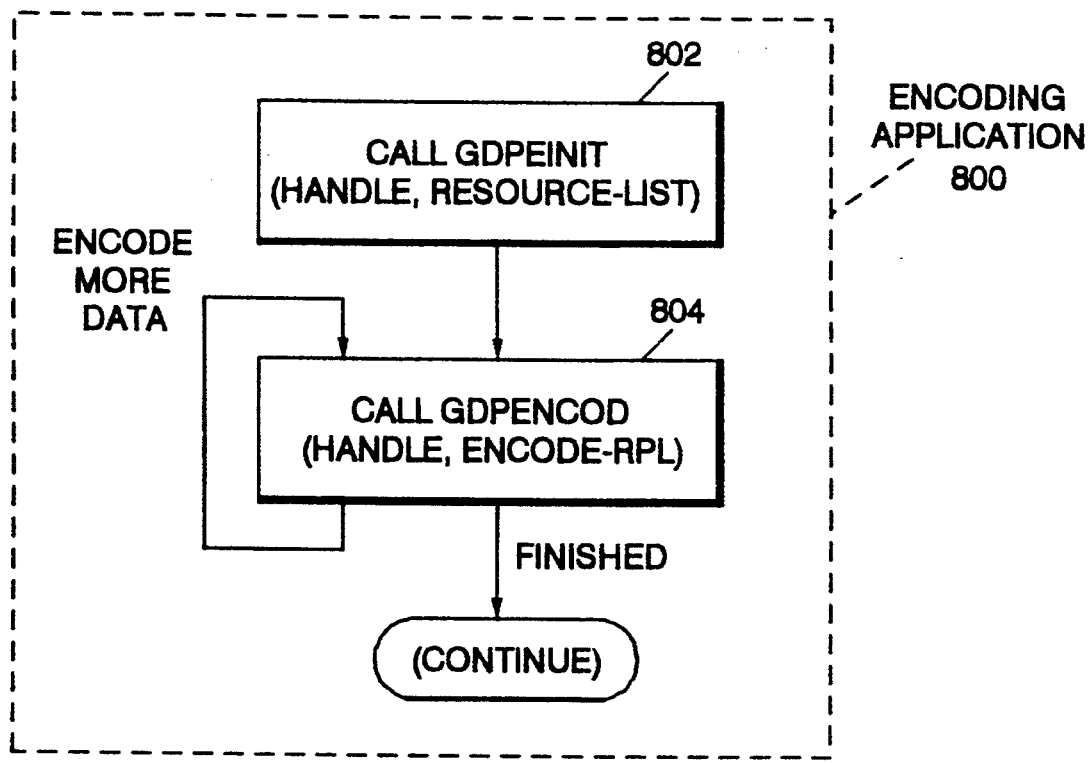
FIGS. 8 and 9 show broadly the interfaces between application programs and the data stream encoder and decoder routines, respectively.
Figure 9:
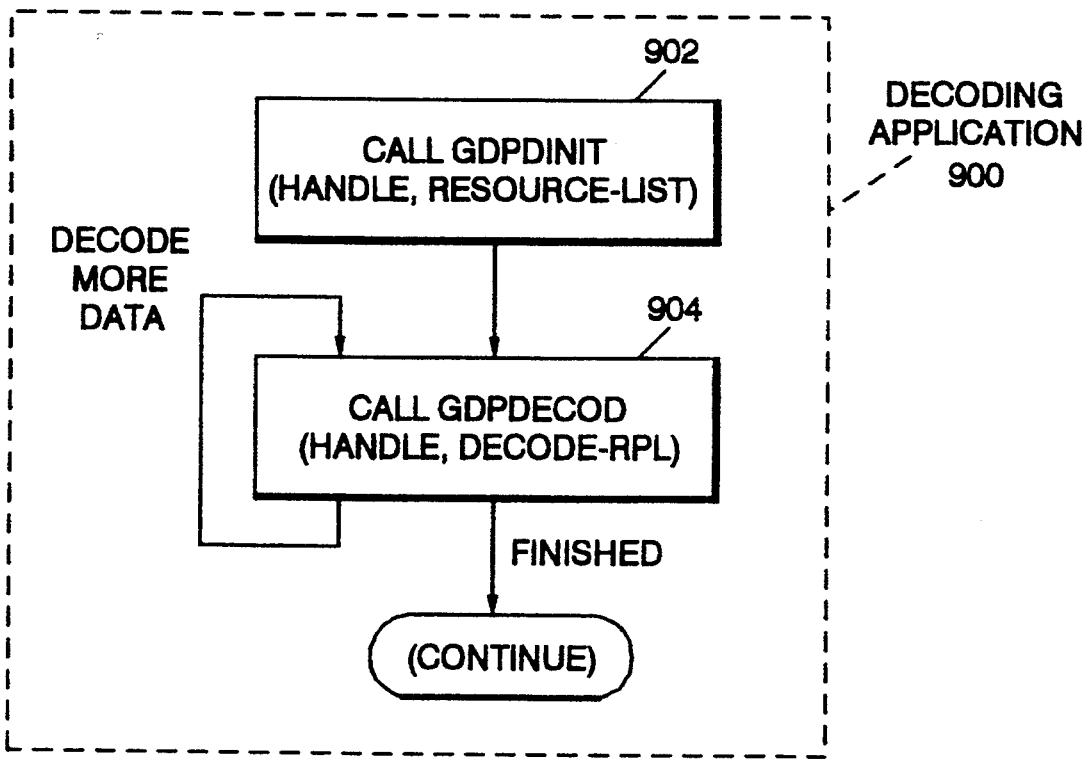

In the illustrative embodiment to be described, there are two phases that an application executes to encode or decode a data stream, initialization and processing. The initialization phase is analogous to an OPEN command and is used to set up the environment and establish communication between the application and the encoder or decoder. As shown in FIGS. 8 and 9, for encoding, the encoding application 800 calls GDPEINIT at 802 and for decoding the decoding application 900 calls GDPDINIT at 902. The encoder and decoder do not "own" any resources in this illustrative embodiment. For example, working storage, I/O buffers, parse tables, and even the routines that read or write the data stream to an external channel or device are passed as a set of parameters (denoted as RESOURCE-LIST) on the initialization call. The channel can be of any type, such as a data link between nodes or even across internal memory between programs within the same processor. In addition to passing resources to the encoder or decoder, the application passes a variable, HANDLE that is returned by the initialization procedure. The initialization procedure formats working storage and initializes state information needed for the encoding or decoding processing. Before the initialization procedure returns to the caller, it sets a value in the variable HANDLE. The HANDLE variable (a pointer) defines the linkage between the application and the parser, and it must be passed on all future calls for encoding (i.e., GDPENCOD) or decoding (i.e., GDPDECOD). Once initialization is complete and the linkage between the application and the encoder or decoder has been established, data stream processing can begin. This is illustrated at steps 804 and 904. The data to be encoded or decoded are identified by parameters in the respective request parameter lists for encode (ENCODE-RPL) and decode (DECODE-RPL). The individual parameters that comprise the encode and decode RPLs are described in detail later. Using the item data referenced by the ENCODE-RPL in conjunction with a parse table, the encoder 804 constructs the encoded output data stream. For decoding, the decoder returns information in DECODE-RPL that tells the application which items have been extracted from the input data stream and where they are stored. The application calls GDPENCOD at step 804 for encoding data and GDPDECOD at step 904 for decoding data. To process an entire data stream, the application may issue many calls to GDPENCOD or GDPDECOD.

Figure 18:
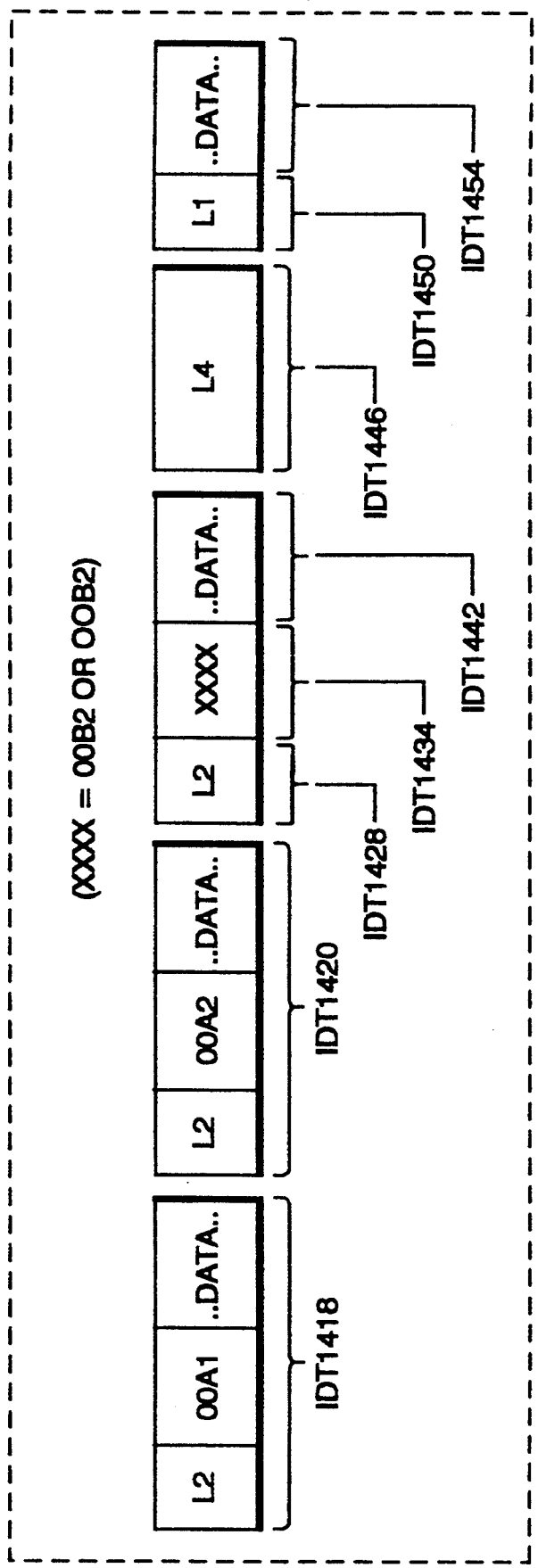
FIG. 18 shows one illustrative data stream format used to describe the operation of the invention with respect to the parse table of FIGS. 13 and 14.

Parse tables are used that tell the parser how to encode and decode any given data stream. These parse tables are defined when an application is designed, using a data stream definition language (DSDL) as illustrated in FIG. 18. However, the parse tables may be defined in any suitable manner. Since the DSDL forms no part of the invention, it is not described in detail herein.

Figure 10:
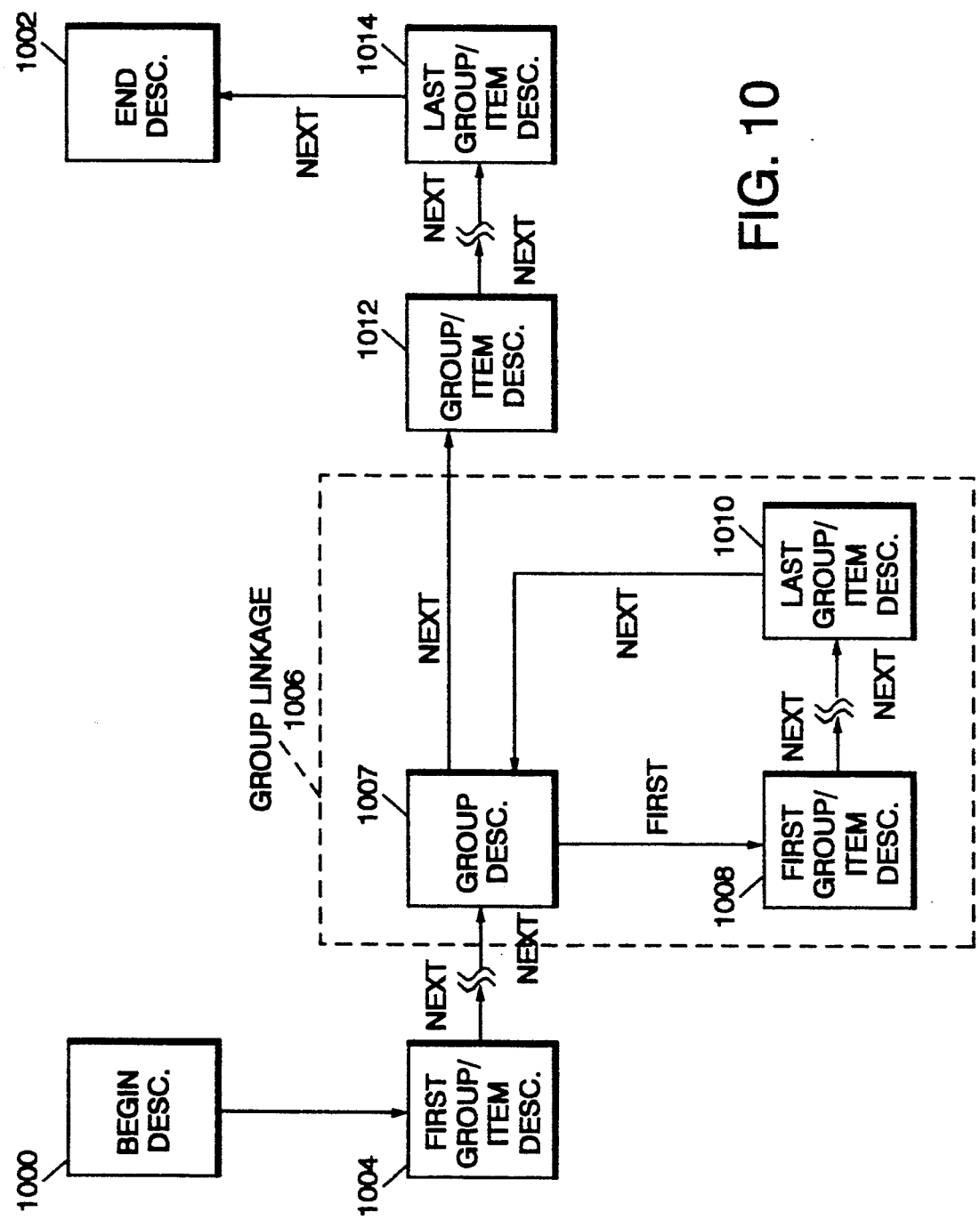
FIG. 10 shows the logical organization of group and item descriptors that make up an illustrative parse table; the parse table, in turn, informs the encoding and decoding routines of the parser how to process a specific type of data stream.

A parse table is composed of a set of data item descriptors linked together to form a tree structure as generally depicted in FIG. 10. A parse table begins with a begin descriptor 1000 and terminates with an end descriptor 1002. The begin descriptor points to a list of templates (not shown in FIG. 10). Templates are described in detail below. For the time being, suffice it to say that templates are used to specify the order of mapping of data items between the parser and the application. A template is similar to a record, such as a database record, for example; it specifies a grouping of items in a format that is convenient for processing. Multiple templates may be defined for a single data stream to enable the calling program to process the data stream "a piece at a time".

The begin descriptor also points to a first descriptor 1004 which, in turn, points to the next descriptor in sequence, and so on until a last descriptor 1014 points to the end descriptor 1002, thus ending the parse table. In general, any of the descriptors that are linked between the begin descriptor and the end descriptor may be either an item descriptor or a group descriptor. Each group descriptor may contain a number of linked item and/or group descriptors. The group descriptor illustrated ib box 1006 contains a group descriptor 1007 which, in turn, contains a series of item or group descriptors 1008 . . . 1010 that form some logical part of the group. As will become apparent, the group and item descriptors may be nested.

Figure 11:
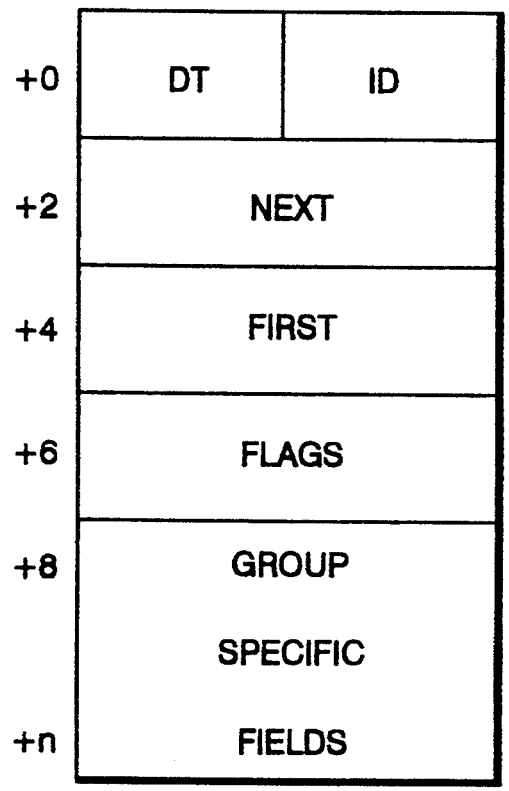
FIGS. 11 and 12 show illustrative layouts of group and item descriptors, respectively.
Figure 12:
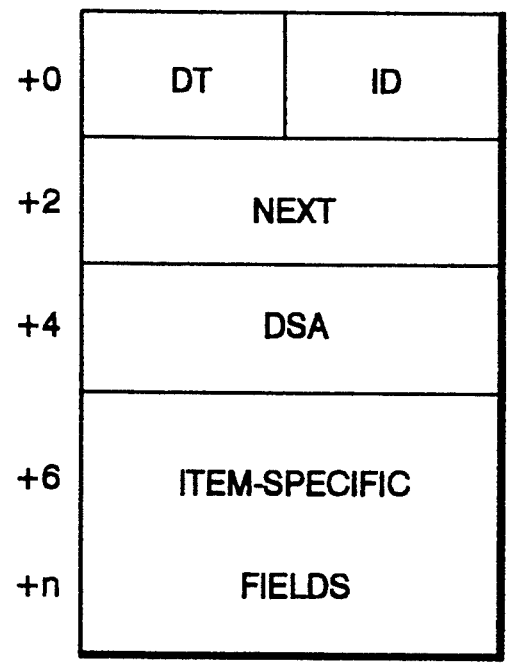

The structures of group and item descriptors are shown in FIGS. 11 and 12, respectively. The first byte of both types of descriptors contains the descriptor type (DT), i.e., whether it is a group or an item descriptor. The second byte of a group or item descriptor contains an identifier (ID). By way of example, a value of zero in an ID field indicates that the item or group is not identified. An identified group means that the group is associated with a template. Similarly, an identified item means that this data stream item is associated with a field defined in a template. If an item is not identified, it is constructed automatically during encoding and not passed to the application during decoding.

For group descriptors (FIG. 11), the FIRST field is a pointer to, the first child descriptor of the group (which may be either an item descriptor or a group descriptor). The NEXT field is a pointer to the next sibling descriptor (i.e., same hierarchial level) of the group. The FLAGS field consists of a number of control bits defined for the particular descriptor. For example, one bit indicates whether or not the group is required or optional. Other bits indicate if length or repetition checking is to be performed and if an expression should be evaluated to compute the group's length or existence. The group specific fields are fields that may or may not occur depending on the particular group type as specified by the DT value and the setting of the FLAGS control bits. For example, for repeating groups a repetition range is present. For conditional descriptors, the group specific fields contain a pointer to an expression descriptor that gives the criteria that defines when an occurrence of the group exists or is absent.

For item descriptors (FIG. 12), NEXT is a pointer to the next (item or group) descriptor in the parse table. DSA is an offset pointer to a run-time dynamic storage area for those parse tables that require the item value to be saved temporarily during execution of the encoder or decoder. The DSA values are assigned during parse table assembly. At run-time, values are stored in the dynamic storage area at offsets indicated by the DSA fields. By way of example, a DSA value of -1 denotes a "null" value. Typically, temporary values are saved for the computation of length fields that occur in the data stream. During encoding, the DSA value is used to save the offset to the data stream output buffer that marks where a length value must be stored. During decoding, the DSA value is used to save item values that have been decoded that are used to compute the length of group or item structures.

Figure 13:
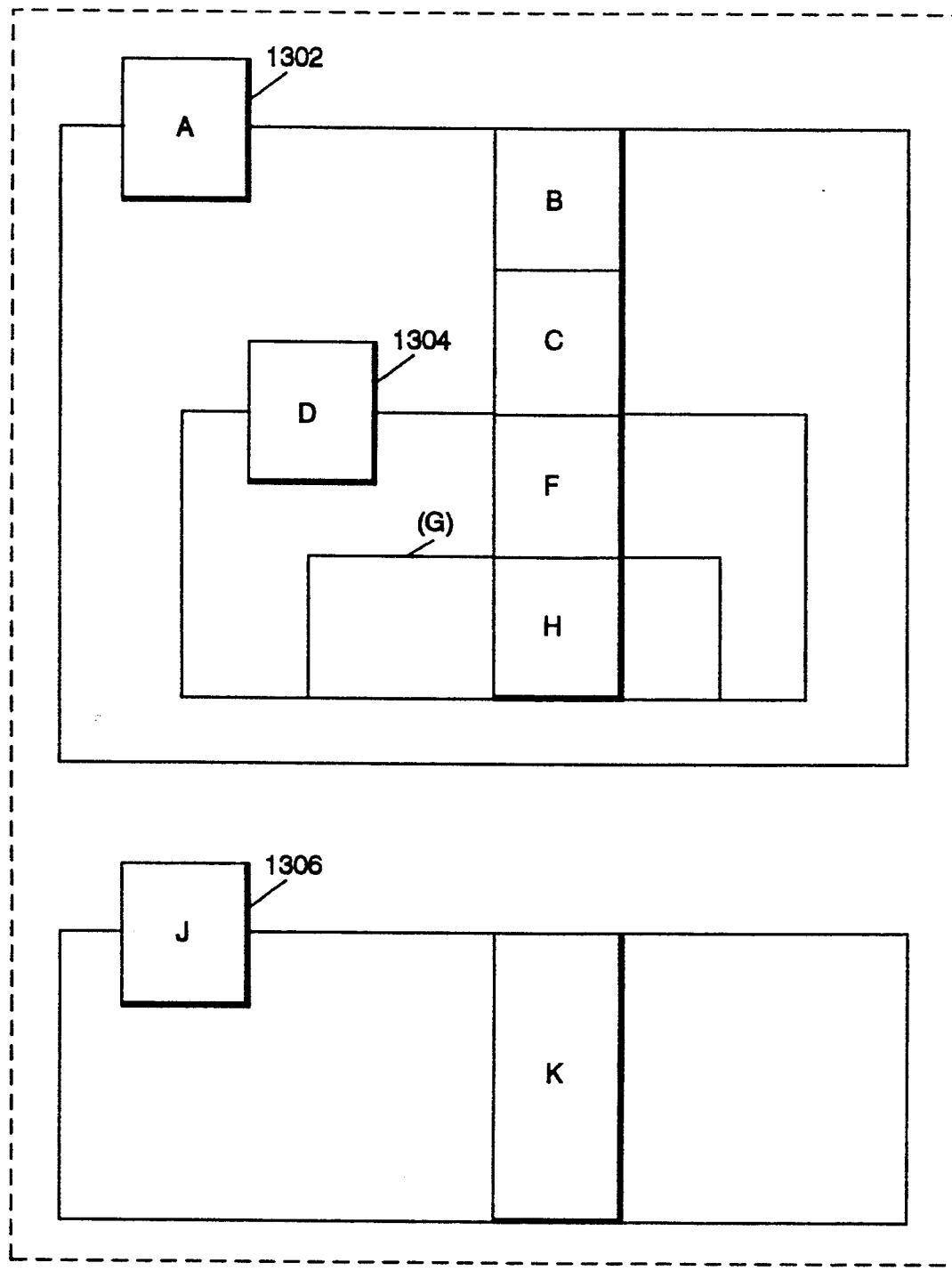
FIG. 13 shows a conceptual organization of one parse table, including group descriptors A, D, G, J and related item descriptors B, C, F, H and K.
Figure 14:
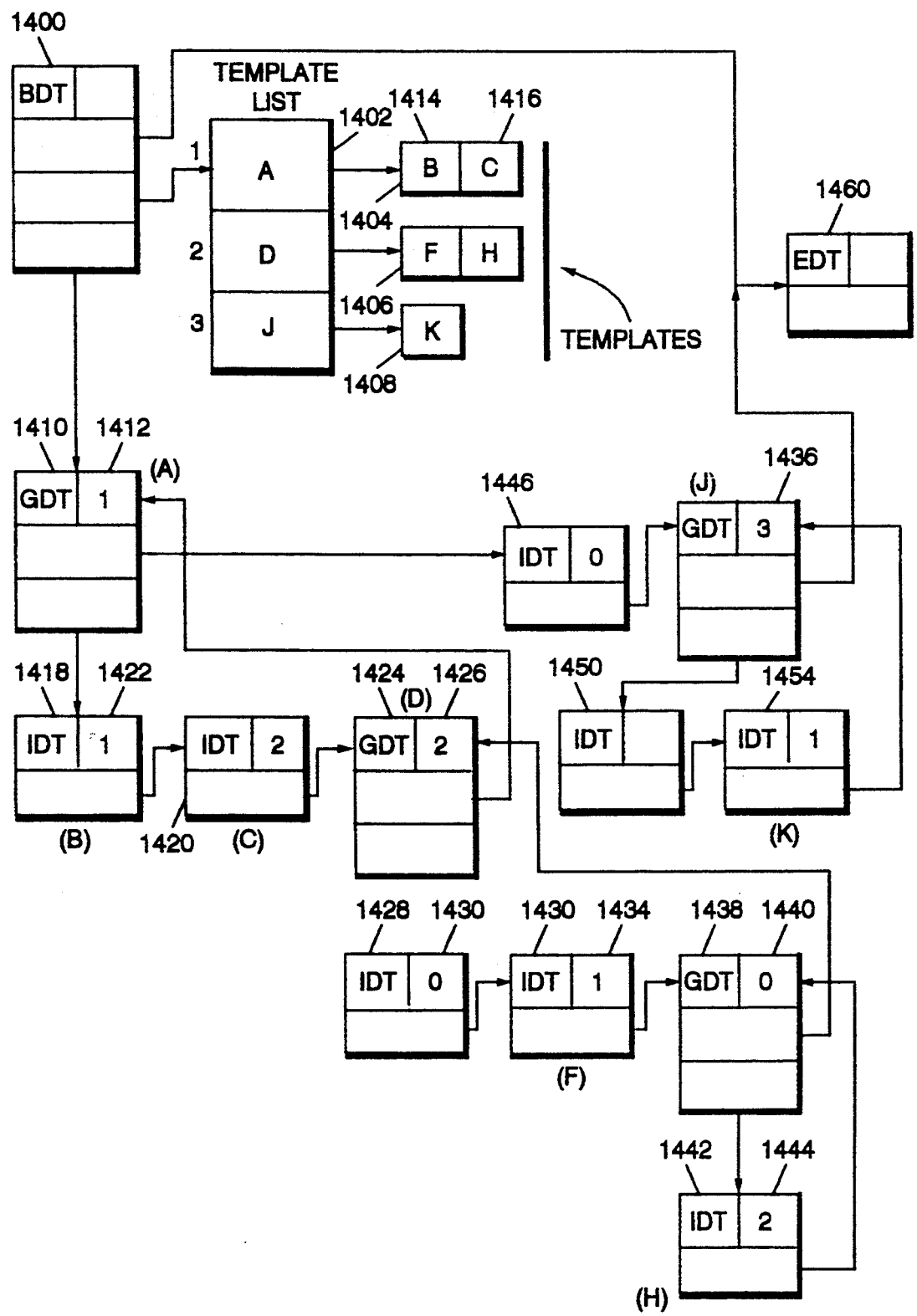
FIG. 14 shows more details of the parse table of FIG. 13.

FIGS. 13 and 14 show a detailed example of an illustrative parse table. FIG. 13 shows the relationship of templates, groups, and items. A, D, and J are identified groups which also correspond to templates defined by the groups, respectively. Group D is nested within group A. Group A consists of items B and C, because group D begins a new template. Template D consists of items F and H even though H is contained in a group G that is nested within group D; this is because group G is not identified (as denoted by "(G)"). Group J is a sibling to group A and also corresponds to template J. FIG. 14 shows more details of the parse table of FIG. 13. The descriptor types shown as BDT and EDT define the beginning and ending parse table descriptors, respectively. Descriptors GDT are group descriptors. Similarly, IDT denotes item descriptors. Different types of item and group descriptors may be specified. There are a number of miscellaneous descriptors for defining expressions which are to be calculated. The following gives a brief description of an illustrative list of different item and group descriptor types that might be present in any given parse table:

GROUP SEQ: Sequential non-repeating group. This group descriptor defines a single group instance in which all subordinate instances (defined by the group's children descriptors) occur in the order defined by the children descriptors. Existence criteria may be specified to define an optional non-repeating group. An optional group is one that may or may not occur in the data stream, depending on the criteria. Occurrence of a non-repeating group may be determined by evaluating a boolean expression, a length expression, or the presence of an "LT" prefix field. If the existence test fails (e.g., a boolean expression evaluates FALSE or a length expression computes zero or null), an instance of the group does not exist and the NEXT descriptor is fetched. The "LT" prefix is a special case in which the group data is preceded by a one or two byte "length" field followed by a one or two byte identification or "type" field. In this case, a look-ahead test is performed to determine if the correct type value occurs at the proper location in the data stream.

GROUP REP: Repeating group. A repeating group means that a sequence of group instances may occur in the data stream. Each instance of the repeating group has the sequential property described for sequential non-repeating groups. There are several ways to specify when the last instance of the group has been processed.

For example, instances of the group may occur until a previously computed length value is exhausted, or until an expression is evaluated and results in a TRUE condition, or while an expression evaluates to a TRUE condition, or a fixed number of times. It may be the case that evaluation of the repetition criteria fails immediately with the result that no instances of the group occur in the data stream. Thus, the repetition criteria also serves as existence criteria.

GROUP SET: A set of member instances. This group type specifies that its member instances may occur in the data stream in any order, not necessarily the order in which the member descriptors are defined. Member components of a group set may be required or optional. The group set descriptor and its children may be interpreted several times to detect all the member instances of the group instance. The member descriptors of a group set descriptor may be any CONDITIONAL group descriptor or item descriptor (i.e., ITEMLT—defined below). Since a member instance may occur anywhere among the set of instances, conditional criteria must be specified to determine when a given instance does or does not occur.

Like the repeating group, several criteria may be defined for determining when all subordinate member instances have been processed. For example, if the group length is computed, processing continues until the length is exhausted; similarly, termination may be signalled by evaluation of a "while" or "until" expression. Finally, if no new instances have been detected during the scan of the group descriptor and its subordinates, processing of the group instance is terminated.

ITEMFLEN: Fixed-length item illustratively between 1 and 255 bytes.

ITEMVLEN: Variable-length item illustratively between 1 and 32767 bytes. ITEMUNIQ: Unique constant value illustratively between 1 and 255 bytes. This item type can be used to define constants such as code points and suffix values that are automatically inserted into the data stream by the encoder and removed by the decoder.

STREAM: Stream item. This item type permits an indefinitely long item such as a file or document to be defined.

ITEMLT: Length-Type item. This descriptor specifies a self-defining item illustratively with a one or two byte length followed by a one or two byte type field followed by data (i.e., LT . . . ). Data defined by the ITEMLT descriptor can be further defined in terms of ITEMFLEN, ITEMUNIQ, and ITEMVLEN. ITEMLT is defined for performance optimization due to the common usage of this type of data.

As mentioned above, there are also a number of miscellaneous descriptors. These descriptor types are used to specify expressions that are required to specify existence criteria for groups or items that are optional within the stream and assertions for validity, compute lengths, and look ahead in the data stream when necessary.

TESTLKAH: Look-Ahead Test Descriptor. Causes a look ahead in the data stream +j bytes and performs a test against a k-byte constant. Look-ahead is performed by scanning ahead in the data stream but not changing the state of the data stream cursor that is used to mark the item occurrences that have been processed. This may require that additional data be read from the input device.

DELV: Delta Computation Descriptor. Performs a delta computation of adding or subtracting a constant to a value (e.g., length field) previously encountered in the data stream. For encoding, the constant is added to the data length to compute a length field. For decoding, the constant is subtracted from a decoded length field to derive the actual length of the (item/group) component occurrence. This function allows the same parse tables to be used for both encoding and decoding. For encoding, this function is used to derive the correct length field values, and for decoding this function is used to compute the correct (group or item) data length given a length field and a delta value.

TESTBIT: Bit Test Descriptor. Performs a "test under mask" of a single byte in the data stream.

BOOLOP: Boolean Operation Descriptor. Performs a logical AND or OR comparison between two expressions. Expressions are specified using combinations of these "miscellaneous" descriptors.

RELOP: Comparison Operation Descriptor. Performs a comparison operation between two expressions (i.e., EQ, LE, GE, GT, LT, NE).

LKAHFLD: Fetch Look-ahead Field Descriptor. Retrieves a field of k bytes at an offset of j bytes from the present position (i.e., next byte to be decoded) in the data stream.

TESTUSER: User Test Descriptor. Performs a test on a 32-byte bit mask passed in the decoder request parameter list.

CONDEF: Define Constant Descriptor. Defines a numeric or string constant that is to be used in expression evaluation.

ASSERT: Assertion Descriptor. Defines a condition that must evaluate TRUE to have valid data. There is always a question as the degree to which a parser should perform validity checking on encoded or decoded data. In some cases an application may perform checking more efficiently. In any case, it is not feasible to check automatically all possible conditions (e.g., data dependent) for every data stream type. The assertion descriptor provides the flexibility to check unusual conditions. This descriptor is different from the other miscellaneous descriptors in that it is not referenced from another descriptor as an expression, but occurs in the path of the group or item descriptors. That is, an assertion descriptor is referenced by a NEXT pointer of an item or group descriptor; likewise, the assertion descriptor contains a NEXT pointer to the next descriptor in the parse table hierarchy. The assertion descriptor references two logical expressions, a VALIDIF expression and an optional WHEN expression. In addition, an error code is included. When the assertion descriptor is fetched during the decoding process, first the WHEN expression is evaluated if it is present. If the result is TRUE, then the VALIDIF expression is evaluated. If this result is TRUE, then the decoder fetches the next descriptor; otherwise, control is returned to the calling application with the specified error code. In some cases, depending on the data stream content, the assertion should not be applied. Thus, the WHEN expression is provided to determine whether or not the assertion condition (VALIDIF) should be evaluated. If the WHEN expression is absent, the assertion is always evaluated.

Now, again with reference to FIG. 14, the BDT1400 descriptor points to a template list 1402, which in turn points to the individual template definitions. Here, three templates 1404, 1406 and 1408 corresponding to template labels A, D and J are illustratively included in the list. Each template definition corresponds to an identified group. Template 1404 (group A) corresponds to the group defined at GDT1410. Field 1412 of GDT1410 contains a corresponding index into the template list 1402. Each entry of a template, such as 1414 and 1416, corresponds to an identified item that is contained either within the same identified group or within an unidentified group that is nested within the identified group such that there are no intervening identified groups. In template 1404, entries 1414 and 1416 correspond to item descriptors 1418 (item B) and 1420 (item C), which are contained within the first group descriptor 1410. The IDT itself contains a field, such as 1422, that identifies the entry in the template to which it corresponds. For example, field 1422 of IDT1418 contains a "1" which identifies the first entry B of template 1404. In this illustrative example, GDT1424 is nested within GDT1410. Its field 1426 points to template D. GDT1424 has two item descriptors 1428 and 1430. The template field pointer 1432 of IDT1428 contains a "0", indicating that the item is not identified; thus, the item descriptor does not correspond to a field in a template. The field pointer 1434 of IDT1430 points to the first field F of template 1406. If part of the template (i.e., some items) is contained within an unidentified repeating group, then that part of the template may correspond to repeated occurrences in the data stream. An identified group that is nested (directly or indirectly) within another identified group serves as a boundary that terminates the current template and begins a new template. Thus, a template definition terminates either with the end of the corresponding identified group or with the first nested identified group.

The above parse table concepts are illustrated in 1300 of FIG. 13 which shows more clearly the template, group and item relationships of FIG. 14. The boxes 1302, 1304 and 1306 correspond to templates A, D and J for their respective group descriptors 1410, 1424 and 1436. G refers to GDT1438 which is not associated with any template. B and C are items of group A. F is an item of group D. H is an item of group G and K and L are items of group J. Template A is terminated by the identified group D and includes items B and C. If group D were unidentified, then template A would include items B, C, F, H. Template D (items F, H) spans the unidentified group G and terminates with the end of group D; template J (items K, L) begins with the identified group J and terminates with the end of group J.

Figure 15:
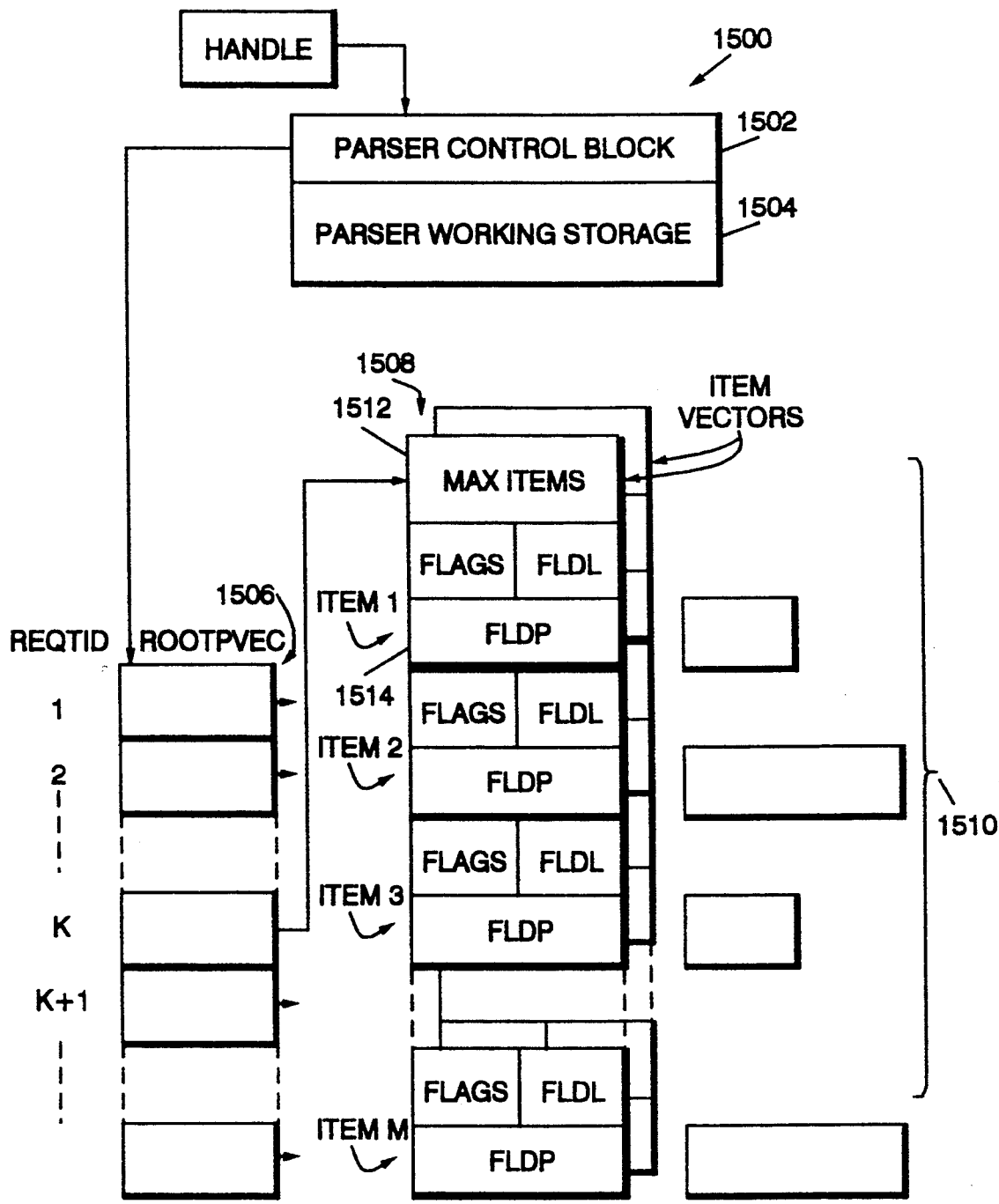
FIG. 15 shows illustrative data structures that form the data interface between the parser and application programs; it is this interface that, in part, relieves the application programs from the burden of detailed knowledge of a particular data stream in use.

FIG. 15 illustrates the data structures defined for passing data occurrences between an application and the parser via the application program interface (API). An important part of the API is the three-level hierarchy consisting of the Root Pointer Vector (ROOTPVEC) 1506, the item vectors ITEMVECT 1508, and the item data elements 1510. It is recalled that a call to the initialization procedure (i.e., GDPEINIT or GDPDINIT) accepts a resource list (RESOURCE-LIST) and returns a parameter, HANDLE, that must be passed on all subsequent calls to GDPENCOD or GDPDECOD. The RESOURCE-LIST passed to the initialization procedure includes the address of the parser work area, the parse table, and the "root vector" (ROOTPVEC) 1506. The initialization procedure allocates a PARSER CONTROL BLOCK 1502 within the parser work area 1500 and saves the addresses of the parse table and the root vector in the parser control block. The HANDLE provides addressability to all the resources needed by the parser. In this instance of the application/parser interface, the HANDLE points to the parser control block. The root vector contains a pointer for each template defined in the parse table, The TEMPLATE ID is defined as an index to the root vector pointer array 1506. The REQTID is passed in the request parameter list of GDPENCOD and GDPDECOD to identify the template instance that is passed between the application and the parser. The entries of the root vector point to item vectors (ITEMVECT 1508). The item vectors contain information about the data items corresponding to the identified template. Data for each template is passed to/from the parser via an item vector. The first entry MAXITEMS 1512 of ITEMVECT contains the number of elements of the item vector and is equal to the number of items in the template. MAXITEMS is set by the decoder when a template instance has been decoded. After control is returned to the application from GDPDECOD, MAXITEMS may be used by the application to scan the item vector. The item vectors contain one entry for each item defined in the template. For example, 1514, corresponding to item 1 in ITEMVECT, contains a FLAGS field, an item length field FLDL and a pointer FLDP to the storage area of the data items 1510 where the actual stream data for this item is stored by or for the parser. For purposes of this disclosure, FLAGS contains a sequence field (SEQ) and three flags: a null flag (NULL), an application specified length flag (ULEN), and a move (MOVE) flag. The sequence field is discussed in the detail example. During encoding, NULL is set by the application to indicate that no value for this item will be encoded. During decoding, the decoder sets this bit if no instance for the item was found in the data stream. The ULEN flag is only used during encoding. The application sets this flag if it wishes the application to use a user-provided length (FLDL) for the data to be encoded. Otherwise, the encoder will use the value specified in the template definition in the parse table. The MOVE flag is only used during decoding. The application sets this flag if it wants the decoder to move a decoded instance of this item to a application specified data area. In this case, the application must also set the FLDP pointer before calling GDPDECOD. If MOVE is not set, the decoder sets FLDP to point to the item data in the parser working storage.

Figure 16:
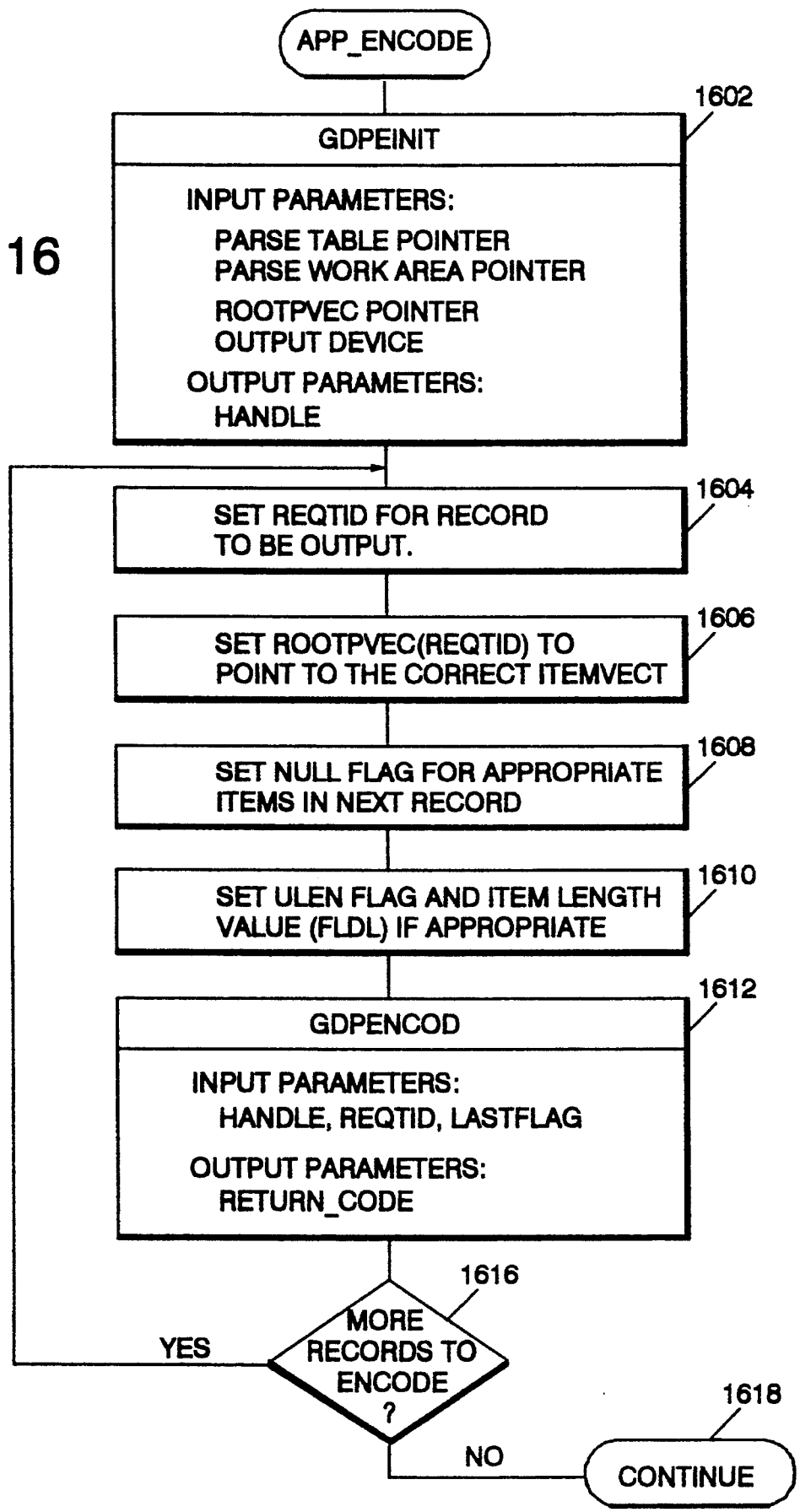
FIGS. 16 and 17 show more details of the calling interface between application programs and the encoding and decoding routines of the parser, respectively.

APP_ENCODE in FIG. 16 is a more detailed version of FIG. 8 and shows illustrative steps that an application uses to encode data items for transmission. The first thing to accomplish is to initialize the parser. This is done at step 1602 with a call to the initialization routine GDPEINIT. Parameters identifying the parse table to be used, the parser work area, the root vector, and the output device to which the encoded stream is to be delivered are passed with the call. GDPEINIT returns HANDLE, which identifies this application/parser instance, to be used on all subsequent parsing calls. The generation of a record for parsing begins at step 1604. Here, the application sets the template identifier for the template or record instance to be encoded. In 1606 the template identifier is used to index the root vector to set the address of the ITEMVECT structure that is used to pass the item data for the record to the encoder. Next, in 1608, the null flag is set in ITEMVECT for each item of the record that happens to be empty. Such an empty item might occur, for example, if a series of database records are being transmitted and a middle initial field of a name contained in a database record is empty. Also, for each item as appropriate, if the application is able to use less that the full length of an item, at step 1610 it sets the ULEN flag for that item in ITEMVECT. In such a case, the item length is set by the application in the length field FLDL for that item. Otherwise, the full item length as specified in the parse table will be used by the parser. Using the transmission of database records as an example, an application might wish to override the default length of an item by setting the ULEN flag when fixed length database records are being transmitted. In such a case, the application may wish to send only the actual lengths of names, for example, present in the database records, rather than the full length allocated in the database for a name. In any event, the values for the items of the record must be resident in storage as illustrated by 1510. However, the item values are not required to be contiguous and may be "scattered" throughout memory in a manner that is most natural for the application. Finally, the item data pointer FLDP must be set (1612) for each item to be encoded.

GDPENCOD is called at step 1614 to actually encode a record. The handle, template identifier, lastflag, and return code parameters are passed with the call. The LASTFLAG parameter is a flag that indicates if this is the last occurrence of a repeating group; it is not significant for templates that do not correspond to repeating groups. The process continues as conceptually indicated at step 1616 while there are records remaining to be encoded and at the pace desired by the application. When encoding is completed, application processing continues 1618. This processing may, for example, free the storage used for the parser work area or close the output device. These actions, however, are application-specific and not related to this embodiment.

The order in which template occurrences can be passed is derived by the group hierarchy defined by the parse table. Data must be passed in hierarchical order in the order of definition unless the components are defined to be order-independent. For example, in FIG. 14, data for templates A, D, and J are encoded in that order. In cases where multiple templates are defined by identified groups within a group-set descriptor, the records may be encoded in any order because no ordering constraint is imposed by the parse table.

Figure 17:
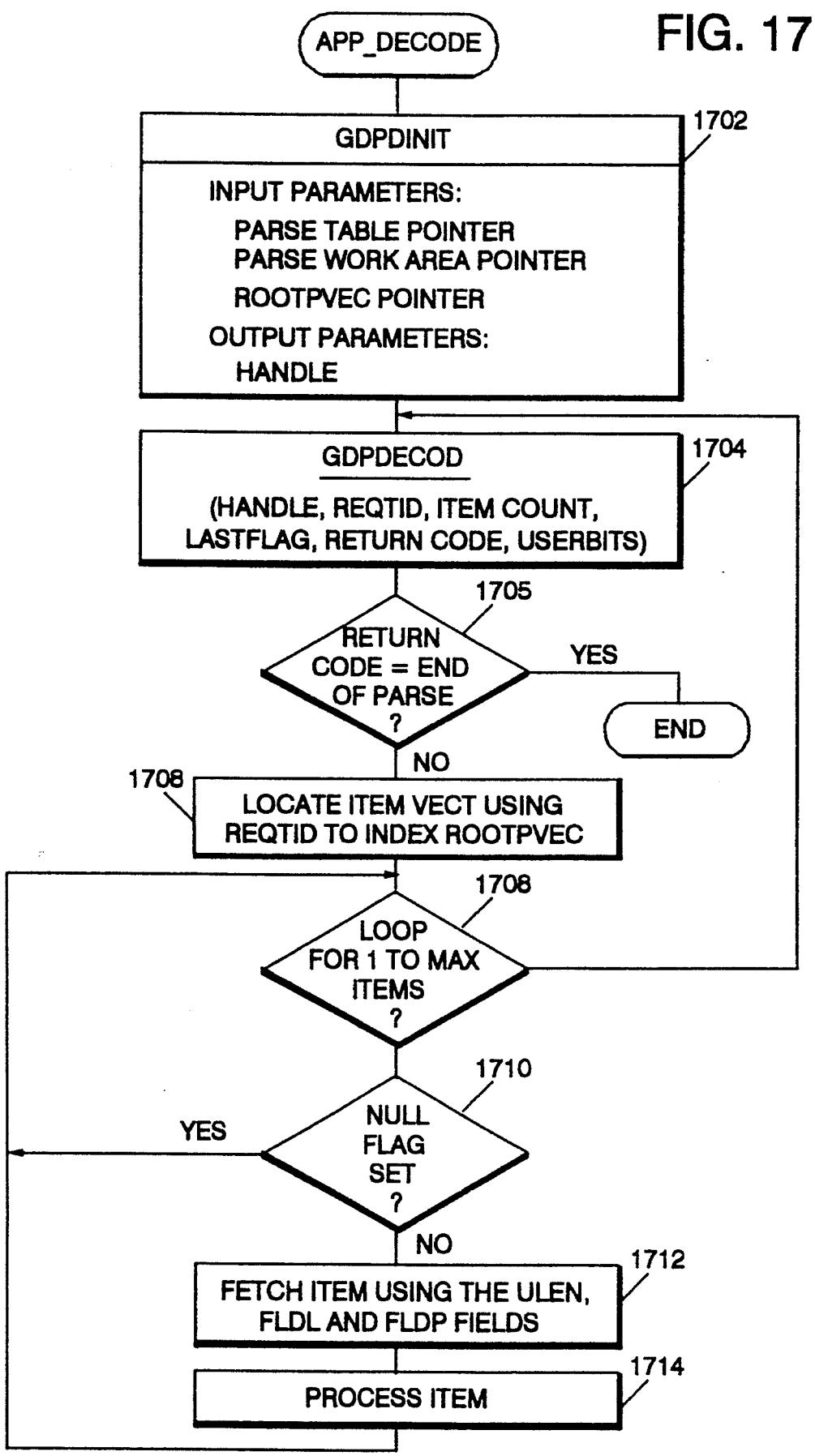

FIG. 17 is a more detailed version of FIG. 9 and shows illustrative application steps associated with the decoding of an incoming data stream. Again, the application first initializes the parser with a call to GDPDINIT at step 1702. A call is made to routine GDPDECOD at step 1704 to fetch the first incoming record. When GDPDECOD returns control at step 1705, if the return code is not "end-of-parse", any incoming data items for the first record will have been stored in the item storage 1510 by the parser. On the other hand, if the entire data stream has been parsed, GDPDECOD will return an end of parse signal in the RETURN_CODE parameter. To fetch the data, assuming that the end of parse signal is not present, step 1706 uses the returned template id to index ROOTPVEC to locate the pointer to the correct ITEMVECT structure. FLDP then points to the stored data 1510 for each item. Step 1708 sets up a loop for reading each item from storage 1510. The loop parameter is set to the value contained in the first entry MAXITEMS of ITEMVECT. (Recall that the decoder sets MAXITEMS before returning to the caller.) The MAXITEMS value is generated as part of each template descriptor in the parse table. For each item, step 1710 determines if the null flag is set. If so, this item is ignored. Otherwise, steps 1712 and 1714 fetch and process the item in some appropriate manner and the loop is continued for the next item. For each decoded item, the item data length (FLDL) is set by the decoder and used by the application to fetch the item data. As described previously, the FLDP field may be set by either the decoder or the application, depending on the MOVE flag.

In general (e.g., with a complex parse table in which many templates are defined), the application may not be able to predict the next template occurrence to be decoded; this is because structures and substructures defined by the parse table may allow their data instances to occur in any order. Thus, the application must set all the root pointer vector entries and initialize the item vectors that correspond to any of the possible templates that could be processed on the next call. Only one template occurrence may be decoded per call to the decoder. Thus, it is possible to allocate one item vector and set all the relevant root vector pointers to reference it. The application must also set any relevant controls in the FLAGS field. For example, the application can choose "move" or "locate" mode.

The encoding and decoding parser logic is illustrated by a detailed example. Table 1 below shows a sample encoded specification of the parse table illustrated in FIGS. 13 and 14. The labels (e.g., BDT1400) designate the descriptor type and the reference to the illustrated descriptors in FIG. 14. However, FIG. 14 is missing details that are necessary for a complete parse table such as the specific item and group types and the miscellaneous descriptors required for specifying existence criteria and computed length expressions. These details are supplied in Table 1. Miscellaneous descriptors associated with a specific item or group descriptor are so designated by using the same reference number as the last four characters of their labels (e.g., CHK1410 is tied to GDT1410, etc.). In the following discussion, the line numbers will be used to refer to specific descriptors.

TABLE 1

| PARSE TABLE SPECIFICATION |
| --- |
| 1. BDT1400    BEGINDEF TLIST=(A,D,J) |
| 2. A      . TEMPLATE (B:BYTE(10),C:CHAR(6)) |
| 3. D      . TEMPLATE (F:BYTE(2),H:CHAR(50)) |
| 4. J      . TEMPLATE (K:BYTE(20)) |
| 5. GDT1410    . GROUP SET,ID=A,OCCURS=(WHILE,CHK1410) |
| 6. CHK1410    . . TESTLKAH 2,TYP1410 |
| 7. TYP1410    . . CONDEF (X'00A1',X'00A2',X'00B1',X'00B2') |
| 8. IDT1418    . . ITEMLT ID=B,TYPE=X'00A1',LENRNG=(4,10),REQ=YES |
| 9. IDT1420    . . ITEMLT ID=C,TYPE=X'00A2',LENRNG=(2,6),REQ=NO |
| 10. GDT1424    . . GROUP SEQ, ID=D,OCCURS=(WHEN,CHK1424A),REQ=NO |
| 11. CHK1424A    . . . TESTLKAH 2,CHK1424B |
| 12. CHK1424B    . . . CONDEF (X'00B1',X'00B2') |
| 13. IDT1428    . . . ITEMFLEN LEN=2 |
| 14. IDT1434    . . . ITEMFLEN ID=F,LEN=2 |

TABLE 1-continued
PARSE TABLE SPECIFICATION

```
15. GDT1438 ... GROUP SEQ,OCCURS=(LENGTH,LEN1438),REQ=NO
16. LEN1438 .... DELV IDT1428,4
17. IDT1442 .... ITEMVLEN ID=H,LEN=LEN1438,LENRNG=(4,50)
18.       ... ENDGROUP GDT1438
19.       .. ENDGROUP GDT1424
20.       . ENDGROUP GDT1410
21. IDT1446 . ITEMFLEN LEN=4
22. GDT1436 . GROUP REP,ID=J,OCCURS=(LENGTH,IDT1446),REPRNG=(0,1000),REQ=NO
23. IDT1450 .. ITEMFLEN LEN=1
23. IDT1450 .. ITEMFLEN LEN=1
24. IDT1454 .. ITEMVLEN ID=K,LEN=IDT1450,LENRNG=(1,20)
25.       . ENDGROUP GDT1436
26. EDT1460   ENDDEF
```

The hierarchical structure is expressed as nested groups where a group is defined by matching GROUP-/ENDGROUP statements. The ITEMLT expresses a data structure as illustrated in FIG. 1. The "TYPE" parameter supplies the two byte type value which is stored as part of the IDT structure defined for the ITEMLT descriptor type.

Since the template list of the BEGINDEF statement specifies (A,D,J), templates A, D, and J have template identifiers (TIDs) of 1, 2, and 3, respectively. Similarly, the item identifier (IIDs) are assigned their ordinal position within the TEMPLATE statements; e.g., items B and C of template A are assigned item identifiers 1 and 2, respectively. This is consistent with FIG. 14.

In FIG. 18, a data stream format is illustrated that is consistent with the parse table of FIGS. 13 and 14. A specific stream example in this format is traced below, first through the encoding logic and subsequently through the decoding logic. Remember that there is nothing in the data stream that explicitly identifies group descriptors in the parse table. The first, three self-describing LLTT constructs (designated by IDT1418, IDT1420, and (IDT1428, IDT1434, IDT1442)) may occur in any order because they are defined as members of a group 1410 that defines a GROUP SET; furthermore, of the above three items, only IDT1418 is required to occur in the data stream. (REQ=YES in statement 8). Subsequently, a four byte length field (IDT1446) must occur. Lastly, a repeating sequence of variable length byte strings may follow such that each byte string occurrence consists of a one byte length field (IDT1450) followed by a byte string of that length (IDT1454). IDT1450 and IDT1454 correspond to GDT1436 which is specified Table 1 to be a repeating group. This group is optional if the four byte length field (IDT1446) contains a zero, since the repetition range (REPRNG in table 1—line 22) specifies a minimum of zero.

During encoding of the explicit fields shown in FIG. 18, GDPENCOD will be called four times: once for template A, once for template D, and twice to encode two occurrences of template J. For illustration, the data to be encoded, as shown in FIG. 19, is 'Computers', X'00B2', 'SNA networks', 'IEEE', 'ACM' and is described in the data structures as:

| TEMPLATE NAME TID | ITEM NAME IID | DATA |
|---|---|---|
| A | 1 B | 1 'Computers' |
|   | 1 C | 2 |
| D | 2 F | 1 X'00B2' |
|   | 2 H | 2 'SNA networks' |
| J | 3 K(1) | 1 'IEEE' |

-continued

| TEMPLATE NAME TID | ITEM NAME IID | DATA |
|---|---|---|
| J | 3 K(2) | 1 'ACM' |

It is assumed that initialization has been performed and that the linkage data structures depicted in FIG. 15 are established. The root vector (ROOTPVEC) contains three entries, one for each template A, D AND J; e.g., ROOTPVEC(2) references the item vector for template 2 (alias D). Similarly, there are three item vectors. Each element of an item vector is shown in FIG. 15 to contain three fields: FLAGS, FLDL, and FLDP. FLAGS defines a structure that consists of a one byte sequence field (FLAGS.SEQ), a null flag (FLAGS.NULL), a user length flag (FLAGS.ULEN), and the "move" flag (FLAGS.MOVE). For the encoding function only the NULL and ULEN flags are used. FLAGS.NULL is set to '1' if the data value for the item is null (i.e., no data occurrence will be encoded for that item). FLAGS.ULEN is set to '1' if the calling program wishes to explicitly supply the length (via FLDL field) of the data element to be encoded. If FLAGS.ULEN is '0', then the encoder will use the constant length value defined in the TEMPLATE statement in the parse table (e.g., a length of 50 for item H in statement 17 of Table 1.) That means that the item storage 1510 for each data item must be at least that large and, depending on the item data type, that the appropriate pad characters are supplied by the application. Normally, for variable length data the calling program will explicitly specify the item length value.

Field FLDL is set to the length of the item occurrence if FLAGS.ULEN is '1'.

Field FLDP contains a pointer to the appropriate data item 1510 to be encoded for each item element. For notational convenience, fields (e.g., FLDL) in the item vectors will be qualified by their respective template name. For example, D.FLDL(2) refers to the length field for the second item (i.e., "H") of template "D".

The procedure GDPENCOD has four input parameters: HANDLE, REQTID, LASTFLAG, and RC. HANDLE is generated by GDPEINIT and references control information, the parse table, and other resources. REQTID contains the requested template identifier (TID) of the template that the caller is requesting to be encoded on any given call of the encoding routine. LASTFLAG indicates when the last instance of a repeating group has been processed. RC is a return code that returns status of the procedure.

In describing encode processing, several variables need to be described.

CURDES Current descriptor. This variable references the current descriptor being examined by the encode. Initially, CURDES is set to BDT1400.

CURTID Current template identifier. This parameter contains the template identifier of the template being processed by the encoder. Initially, this value is null.

STACK. A push-down stack to handle recursion of groups.

CURSOR. Data stream cursor that marks the next available position in the data stream for encoded data to be written. Initially, CURSOR=1 (i.e., the first byte of the output stream).

The encoded data stream produced from the encode processing below is shown in FIG. 19. The encoding steps are as following.

ENCODE TEMPLATE A

PARAMETER SET-UP AND PROCEDURE CALL: First, the item vector for template D is initialized by the caller:

1. A.FLDP(1) is set to reference the data element 1510 for item descriptor B (i.e., 'Computers').
2. A.FLAGS.ULEN is set to '1' to indicate that the caller is supplying the data length.
3. A.FLDL(1) is set to the length of the data element for item B (i.e., 9).
4. A.FLAGS.NULL(1) is set to '0' to indicate that the item occurrence for B is NOT null.
5. A.FLAGS.NULL(2) is set to '1' to indicate that the value for item C is null.
6. Set REQTID=1 (i.e., the TID for template A)
7. CALL GDPENCOD(HANDLE,REQTID,LASTFLAG,RC). The value of LASTFLAG is irrelevant.

ENCODER PROCESSING OF TEMPLATE A

1. Starting with CURDES=1400, the encoder scans the parse table looking for a group descriptor with an ID equal to REQTID (i.e., 1). This occurs when CURDES=1410 and corresponds to statement 5 of Table 1. At this point CURTID is set to REQTID.
2. An entry is pushed onto STACK to represent the group descriptor and the scanning continues with the first item of the group (i.e., IDT1418 in FIG. 14 or statement 8 in Table 1.)
3. Descriptor 1418 (ITEMLT ID=B) is identified. The next step is to analyze the item vector entry in FIG. 15 that corresponds to the item to a) determine if a non-null value has been supplied by the caller and b) fetch the data and encode it according to the item descriptor. In this case, a value is present (i.e., 'Computers'). This ITEMLT descriptor defines a two byte length field (LL) and a two byte "type" field (TT) because the TYPE parameter supplies a two byte constant. Thus, 13 bytes are output to the data stream and CURSOR is incremented to 14. The first two bytes (LL) contain X'000D' (13) which was computed by adding A.FLDL(1) (i.e., the length of the source data) plus 4 to account for the length and type bytes. The third and fourth bytes contain hex '00A1'; this value is fetched from descriptor IDT1418. Bytes 5-13 contain the character string 'Computers'.
4. After processing IDT descriptor 1418, the encoder fetches the next descriptor 1420. This is a IDT descriptor that is also identified, but the corresponding item vector null flag (i.e., A.FLAGS.NULL(2)) indicates that no input value is present. This is permissible since the item descriptor indicates that the item is not required; had the item been required, an error would have been returned to the caller. In this case, the next descriptor is fetched and CURDES=1424.
5. The next descriptor 1424 is a group descriptor (GDT) that defines a member of the current set group (i.e., GDT1410) as another group. It is also identified (ID=D or TID=2). This means that this group begins another template and terminates the current template.

At this point processing is suspended and control is returned to the caller with RC=0. CURDES remains at 1424 but the current template, CURTID, is reset to null (0). Since, the group descriptor 1424 is not required (REQ=NO in statement 10), the caller may not request template D to be encoded on the next call; however, in this example it is assumed that template D is requested to be encoded.

APPLICATION PROCESSING FOR ENCODING TEMPLATE D

PARAMETER SET-UP AND PROCEDURE CALL

1. Set D.FLAGS.NULL(1)='0' and D.FLAGS.ULEN(1)='1'.
2. D.FLDL(1)=2 and D.FLDP is set to reference the data hex '00B2'.
3. Set D.FLAGS.NULL(2)='0' and D.FLAGS.ULEN(2)='1'.
4. D.FLDL(2)=12 and D.FLDP is set to reference the data element 'SNA networks'.
5. REQTID=2 (the TID for template D).
6. CALL GDPENCOD(HANDLE,REQTID,LASTFLAG,RC)

ENCODER PROCESSING OF TEMPLATE D

1. Starting with CURDES 1400, the encoder scans the parse table looking for a group descriptor that has an ID equal to REQTID (i.e., 2). This is immediately satisfied by GDT1424.
2. GDT1424 is pushed onto the stack and scanning begins with the first child descriptor, IDT1428.
3. IDT1428 is NOT identified (i.e., ID=0 in Table 1); therefore, the value must be computed and is not passed as data from the caller. In this case, the next two bytes in the data stream are initialized to hex '0000' and CURSOR is incremented by the 2, which is the length coded in the ITEMFLEN descriptor (statement 13 of Table 1); the cursor value is saved in an encoder working area at an offset designated by the DSA (Dynamic Save Area) field of the item descriptor (see FIG. 12). This will be used later to backfill a length value.

Next, the encoder fetches the next descriptor, IDT1430.

4. IDT1430 is identified and the item value, hex '00B2', is fetched via the item vector for template D as previously described. The value is emitted to the data stream and CURSOR is incremented by 2.

The next descriptor, GDT1438, is fetched.

5. GDT1438 is not identified in Table 1 (ID is omitted in statement 15), so it is stacked and processing continues with the first member descriptor of this group, IDT1442.
6. The data reference and data length for item H are fetched from the second element of the item vector (FIG. 15) for template D and the data element for item H is emitted to the data stream; i.e., D.FLDL(2) (12) bytes of data starting at D.FLDP(2) are moved to the data stream and CURSOR is incremented by 12. Since IDT1442 is a variable length descriptor as set forth by the parameter ITEMVLEN of statement 17 of Table 1, additional processing is performed to backfill the length field defined by the LEN parameter of statement 17. The LEN parameter refers to statement 16. The constant (4) on the DELV descriptor (LEN1438) of statement 16 is added to the data length to produce a value of 16. The reference IDT1428 of statement 16 points to the descriptor that defines the length field for this item. Recalling that the data stream cursor position for the item IDT1428 was saved previously, the encoder using the DSA field in IDT1428 stores the value of 16 (hex '0010') in the data stream at cursor position 14.

7. The next descriptor of IDT1442 is fetched, resulting in CURDES=1438. Since this descriptor is also the one (referenced) on the top of the stack, and "end-of-group" is signaled. During processing of a group, the accumulated length of data output to the data stream is maintained in the stack. When the end-of-group occurs, the group length is used to backfill length fields if the group is "length bounded." This is the case with GDT1438 since the "LENGTH" keyword is specified in the OCCURS clause of statement 15. This processing is similar to that described previously for IDT1442. In this simple example, the length specification for the group GDT1438 is the same as that of the variable length item IDT1442 and the length of the group is 12 because there is only one item. Therefore, the same result will occur—the value 16 is stored at cursor position 14. At this point, the stack is popped and scanning continues with the next descriptor of GDT1438, which is GDT1424.

8. An end-of-group" is signaled, because descriptor 1424 is now on top of the stack. The necessary end-of-group processing is minimal because GDT1424 is not length-bounded. The accumulated length of the top stack entry is added to the previous entry and the stack is popped. However, processing does not continue immediately because the ID of the terminated group matches the caller's REQTID, indicating that processing of the current template is complete. CURDES is set to next descriptor of GDT1424 (i.e., 1410), CURTID is set to null, and control is returned to the caller with RC=0, indicating that template D has been successfully encoded.

ENCODER PROCESSING OF TEMPLATE J

PARAMETER SET-UP AND PROCEDURE CALL
(FIRST OCCURRENCE)

1. Set J.FLAGS.NULL(1)='0' and J.FLAGS.ULEN(1)='1'.
2. J.FLDL(1)=4 (number of characters in 'IEEE').
3. J.FLDP(1) set to reference data element 'IEEE'.
4. J.FLAGS.NULL(1)='0' to indicate that item K is present.
5. REQTID=3 (TID of template J).
6. LASTFLAG='0' (not the last occurrence of repeating group 1436).
7. CALL GDPENCOD(HANDLE,REQTID,LASTFLAG,RC)

APPLICATION PROCESSING OF TEMPLATE J
(FIRST OCCURRENCE)

1. Recall that upon returning to the caller after successively encoding an occurrence for template D, that the encoder left with the state of CURDES=1410 and CURTID=0. Since, GDT1424 was popped off the stack, the current top of stack entry reflects GDT1410. Upon re-entering the encoder with REQTID=3, since the CURTID is null (0) and CURDES matches the top element in the stack, the stack is popped, and CURDES is set to the next descriptor or IDT1446.

2. IDT1446 is an unidentified (fixed length) item. The processing is similar to that of IDT1428. The next 4 bytes of the data stream are initialized to hex '00000000', the CURSOR is incremented by 4, and the cursor value is saved in a work area at the DSA offset specified in the descriptor IDT1446. The next descriptor, GDT1436 is fetched.

3. GDT1436 has ID=J (TID=3) that matches the REQTID passed in the GDPENCOD procedure call; thus it is selected to process. GDT1436 specifies a length-bounded repeating group as specified by the OCCURS clause in statement. This means that after all the occurrences of the group have been encoded, that the length field (i.e., IDT1446 in this example) will be set to the total number of bytes (of all occurrences) of the group.

4. GDT1436 is pushed on the stack and processing continues with the first child descriptor, IDT1450.

5. IDT1450 is processed like the other unidentified fixed-length fields and IDT1454 is fetched via the next pointer of IDT1450.

6. IDT1450 is identified (ID=K or IID=1) and the data element referenced in the item vector (i.e., 'IEEE') is emitted to the data stream as described previously. In like manner, the length field (IDT1450) is backfilled in the data stream, in this case to a value of hex '04'. Subsequently, the next descriptor, GDT1436 is fetched.

7. As with previous cases, CURDES=1436 and descriptor 1436 is also reflected as the current (top) stack element. However, in this case, an end-of-group condition is not raised because the group is repeating and the LASTFLAG is not set (i.e., '1'B). The stack is not popped, but control is returned to the caller to prepare the next occurrence of template J.

PARAMETER SET-UP AND PROCEDURE CALL
(SECOND OCCURRENCE)

1. J.FLDL(1)=3 (number of characters in 'ACM').
2. J.FLDP(1) set to reference data element 'ACM'.
3. LASTFLAG='1' (the last occurrence of repeating group 1436).
4. CALL GDPENCOD(HANDLE,REQTID,LASTFLAG,RC)

The FLAGS fields remain unchanged from their setting in the first occurrence.

ENCODER PROCESSING OF TEMPLATE J
(SECOND OCCURRENCE)

1. Upon re-entry to the encoder, CURDES=1436, CURTID=3, and REQTID=3. Processing continues with the first child descriptor (IDT1450) in order to process the second (and last) occurrence of template J.
2. The processing described in steps 5-6 for the first occurrence are repeated except that the data element is 'ACM' instead of 'IEEE'.
3. At this point CURDES=1436 and descriptor 1436 is on top of the stack as described previously. However, since LASTFLAG='1', end-of-group processing is performed. The length field (IDT1446) is back filled to the accumulated value of 9, the stack is popped, and the next descriptor (EDT 1460) is fetched.

4. Control is returned to the caller; however, since CURDES references the "END" descriptor, the return code (RC) is set to indicate that parsing of this data stream is complete.

DECODING LOGIC

For decoding, the fields of the item vector are, for the most part, set by the decoder and examined by the calling program after control is returned from decoding a template occurrence. If no occurrence for an item is found in the data stream, the decoder sets the null flag (FLAGS.NULL) for that item. Otherwise, it returns the item length in FLDL and, depending on the setting of FLAGS.MOVE, may return a reference to the item data retained in the decoder working storage. Prior to calling the decoder, the caller may set FLAGS.MOVE='1'B to indicate that the decoder should move the item data from its buffer to the data area designated by the caller. In this case, the application must also set the FLDP field to reference the target data area. If FLAGS.MOVE='0'B, then the decoder sets FLDP to reference the data in its working storage. In this case, the caller is required to process the item data after control is returned.

Another field that is returned by the decoder is a one byte sequence field FLAGS.SEQ. This field is used to capture the order in which items were decoded and serves as a list that can be scanned immediately to determine all the non-null items (of possibly many items) in the template. Specifically, starting with the first element of the item vector, FLAGS.SEQ(J) contains the item number of the J-th item decoded for the template. For example, if a template contains 30 items and only items 9, 15, 26, and 6 were decoded in that order, then FLAGS.SEQ(1), FLAGS.SEQ(2), FLAGS.SEQ(3), and FLAGS.SEQ(4) would contain the values: 9, 15, 26, and 6, respectively. Since the number of items processed is returned by the decoder, the application may immediately access the non-null items without having to scan the entire item vector looking for null flags that are '0'B.

Calls to GDPDECOD are made as:

CALL GDPDECOD(HANDLE, REQTID, ITEMCOUNT, LASTFLAG, RC, USERBITS), where:

HANDLE is generated by GDPINIT and references control information, the parse table, and other resources.

REQTID is returned and contains the template identifier (TID) returned by the decoder that identifies the template that corresponds to the occurrence decoded.

ITEMCOUNT is returned and contains the number of items decoded on the last call.

LASTFLAG is set by the decoder when processing a repeating group. When the last occurrence of a repeating group has been processed, this flag is set to '1' (TRUE); otherwise, '0' (FALSE).

RC is a return code that returns status of the procedure. The possible values are: OK, ERROR, DECODING_COMPLETE.

USERBITS is illustratively 32-bit (full word) bit vector that can be tested via the TESTUSER descriptor coded in parse tables. In this example, this function is not used and is coded as "0" in the examples.

Figure 20:
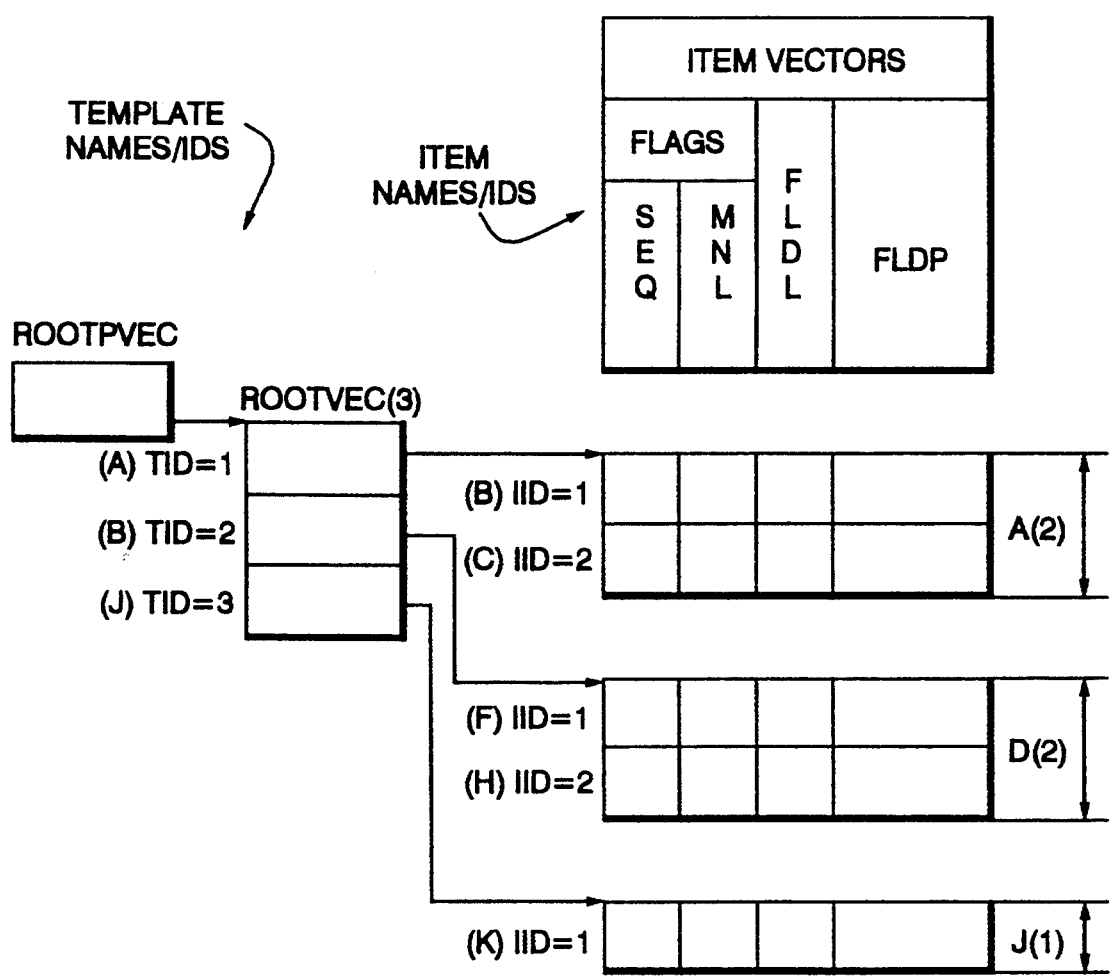
FIG. 20 shows more details of the data structure interface of FIG. 15 as related to the specific example of FIG. 18.

It is assumed that initialization has been performed (i.e., via a call to GDPDINIT) and that the data structure are established as shown in FIG. 20. In FIG. 20, the FLAGS field consists of the sequence field (SEQ) and several boolean values denoted by M (FLAGS.MOVE), N (FLAGS.NULL), and L (FLAGS.ULEN).

After GDPDINIT has been called and HANDLE is returned, CURSOR is initialized to reference the first byte of the input data stream. For the calls to GDPDECOD, move-mode is requested for item B. All other items use locate-mode. It is assumed that all FLAGS bytes in the item vectors are initialized to hex '00'. Thus, the parameter set-up and call sequence is:

1. B.FLAGS.MOVE(1)='1';
2. B.FLDP(1)=reference to 10 byte data area for item B.

Processing proceeds as follows:

1. Starting with CURDES=GDT1410, the decoder evaluates the OCCURS expression to determine if an occurrence of this group is present in the data stream. The predicate TESTLKAH (CHK1410) is evaluated to look ahead in the data stream at an offset of 2 bytes to see if the next 2 bytes (bytes 3:4) matches any of the values in the constant list (TYP1410). The test returns TRUE, because bytes 3:4 contains hex '00A1' which is the first constant in the list. With the TESTLKAH predicate, CURSOR is not advanced.

2. The group descriptor (GDT1410) is pushed onto STACK. During initialization of the STACK entry, all the children members of the group are scanned to determine which ones are required and which are optional. An item bit vector (REQDITEM) is constructed and saved in the stack entry. In this case, there are 3 members: IDT1418, IDT1420, and GDT1424. However, only the first member, IDT1418 is coded as required; thus, the bit vector constructed is binary '100' and saved in the stack entry. A processed item bit vector (PROCITEM) is initialized to all zeros (i.e. binary '000').

3. Since the group is identified (i.e., ID=A), the start of a template is found (TID=1). Since template A corresponds to TID=1, the item vector referenced by ROOTPVEC(1) becomes the current item vector (A). Decoder initializes all FLAGS.NULL to '1'.

4. Next, CURDES is set to the first member of the group, namely, IDT1418.

5. The decoder recognizes that this descriptor is a length-type descriptor, consisting of a 2 byte length field followed by a 2 byte type field.

6. Next, the decoder determines if the data stream conforms to this descriptor definition. The type field in the data stream (bytes 3:4) matches the type field specified in descriptor IDT1418.

7. The data length is derived by subtracting 4 from the length value (i.e., hex '000D'), resulting in a data length of 9.

8. The decoder extracts the data value from bytes 5:13 and sets up the relevant item vector values. Specifically, A.FLDL(1)=9, A.FLAGS.NULL(1)='0', and bytes 5:13 in the data stream are moved to the location referenced by A.FLDP(1) because move-mode is in effect for this item. In addition, A.SEQ(1)=1.

9. The data stream cursor is incremented by 13 (the number of bytes required for the length, type, and data fields). In addition, 13 is added to an accumulator in the STACK to record the total number of bytes processed.

10. The PROCITEM bit vector is updated to reflect that this member (the first member of the group) has been processed; this bit vector is updated to binary '100'. Since, this group is a set in which member occurrences may occur in any order, it may have been the case that this item did not occur first in the data stream even though it is required. The validation of required items is performed when processing of the group occurrence is complete by comparing the REQDITEM and PROCITEM bit vectors.

11. CURDES is advanced (via the next pointer of IDT1418) to IDT1420. IDT1420 is evaluated to determine if a conforming byte string exists in the data stream. The ITEMLT decoding logic looks ahead in the data stream to where the "T" (type) field would occur (bytes 16:17) and tests this value against the type field generated as part of the ITEMLT descriptor. In this case, the test fails, because bytes 16:17 contain hex '00B2', not hex '00A2'. Hence, CURDES is advanced to the next descriptor, GDT1424 (statement 10).

12. The decoder notes that GDT1424 is identified, indicating that this group starts a new template definition. This terminates the decoding of template A and the decoder returns to the caller to process the decoded items. The return parameter, REQTID, is set to the current TID (i.e., 1); the ITEMCOUNT parameter is set to 1; RC=0 is returned indicating successful processing. CURDES remains at GDT1424; likewise, other state information is saved in non-freed storage so that processing can continue properly when the decoder is called again. Note also, that even though processing of template A is complete, processing of the group GDT1410 is not.

Upon return to the calling program, it accesses the correct item vector via REQTID; subsequently, the non-null item values are processed. Eventually it again calls GDPDECOD(HANDLE,REQTID,ITEMCOUNT,LASTFLAG,RC,0) to continue decoding of the second template occurrence D.

DECODE TEMPLATE D (SECOND OCCURRENCE)

1. continues with descriptor GDT1424. The WHEN clause is evaluated to TRUE, because bytes 16:17 of the data stream contain hex '00B2'. Since, GDT1424 is the third member component of a set group (GDT1410), the PROCITEM vector of GDT1424 is updated to binary '101' to reflect than an occurrence for GDT1424 is found. The descriptor GDT1424 is pushed onto the stack, a new current TID is established (because the group is identified), and CURDES is updated to the first child of GDT1424 (IDT1428).

2. IDT1428 is interpreted, and the value is saved in an item save area at an offset designated by the DSA field in the item descriptor. CURSOR is incremented by 2, and the next descriptor, IDT1434, is fetched (via NEXT reference of IDT1428).

3. IDT1434 is interpreted and, since the item is identified, the associated item vector element is updated to reference the value (bytes 16:17). D.FLDP(1) is set to point to the data value (locate mode is in effect), D.SEQ(1)=1, D.FLAGS.NULL(1)='0', and D.FLDL=2. CURSOR is incremented by 2, and the next descriptor, GDT1438, is fetched.

4. The length expression (LEN1438) is evaluated and tested for positive to determine if an occurrence of this group is present in the data stream. This consists of interpreting the DELV descriptor. The value saved for descriptor IDT1428 (step2) is fetched and decremented by 4 (i.e., 16−4) to produce 12. Since the group length is greater than 0, it is selected for further processing.

5. GDT1438 is pushed onto the stack, and CURDES is updated to the first child descriptor (IDT1442).

6. The variable-length item (IDT1442) is determined exactly the same way as previously described for the parent group (GDT1438). This is unusual but occurs here due to simplicity of the example. At this point, CURSOR equals 18. The data length (i.e., 12 (decimal)) is successfully checked against the specified length range (4,50), and the item vector for template D is updated. Specifically, D.FLAGS.NULL(2) is set to binary '0', D.FLDP(2) is set to point to the string: "SNA Networks"; D.SEQ(2) is set to 2 and D.FLDL(2) is et to 12 (decimal). CURSOR is incremented by 12, and the next descriptor (GDT1438) is fetched.

7. GDT1438 is on top of STACK, indicating that processing is complete for this group. Since, GDT1438 is a length-bounded group, a check is performed to ensure that the number of bytes processed for the members of the group equals the pre-determined group length (i.e., 16 bytes). Subsequently, the STACK is popped. Because the group is not identified, processing continues with the next descriptor, GDT1424.

8. GDT1424 is now the top STACK. The STACK is popped and the CURDES is advanced to the next descriptor (GDT1410). However, since GDT1424 is identified, the return parameters are set and control is returned to the caller before the next descriptor is interpreted. Specifically, REQTID=2, ITEMCOUNT=2, RC=0.

At this point the calling application processes the item vector for template D and returns to decode the third template occurrence (J(1)).

1. Processing continues with CURDES=GDT1410 and CURSOR=30. GDT1410 is on top of the STACK. Since GDT1410 is a set group and member occurrences may occur in any order, another iteration through the group descriptors may be required. Therefore, the WHILE expression (CHK1410) is evaluated; a value of FALSE results because bytes 32:33 do not equal any of the values in the list specified by descriptor TYP1410. Next, a check is made to see that all the required members of the set have been processed using the vectors PROCITEM and REQDITEM. The test is successful, so the STACK is popped and the next descriptor (IDT1446) is fetched for processing.

2. IDT1446 is processed, resulting in its value hex '000009' being saved in the item save area as previously described. CURSOR is incremented by 4 and the next descriptor (GDT1436) is fetched.

3. GDT1436 is a repeating group. Initial processing for the repeating group is performed and GDT1436 is pushed onto STACK. The initialization processing includes:
   a) Evaluating the OCCURS clause. The group is length-bounded so the length expression, which in this case is a simple reference to a previously processed length field, is evaluated. This length value (9) denotes the cumulative length of all the repeating occurrences that are encoded for the group.
   b) Since the evaluated length is greater than zero, GDT1436 is pushed onto STACK and the group length (9) is saved in the stack entry. Since the group is identified, the current TID is set to the group ID (i.e, 3).

c) The iteration counter in STACK is initialized to 1, and a data count accumulator is set to 0. Since the group is identified, the current TID is updated to the descriptor ID (i.e., 3). CURDES is set to the first member descriptor (IDT1450).

4. IDT1450 is interpreted and the one byte value (4) is saved in the item save area for future reference. CURSOR is incremented by 1 and the next descriptor (IDT1454) is fetched.

5. The variable-length item descriptor IDT1454 is interpreted as described previously. Since IDT1454 is identified, the item vector for item K (1) in template J (3) is updated to return the value ("IEEE") to the caller. CURSOR is incremented by 4 and the next descriptor (GDT1436) is fetched.

6. GDT1436 is on top of STACK, indicating that the processing of an occurrence has completed. For repeating groups after each occurrence is decoded, termination criteria is evaluated to determine if the last occurrence had been processed. For this repeating group, processing is compete when the number of bytes decoded equals the group length computed during initialization of the repeating group. At this point, one iteration of the group results in 5 bytes processed; there are 4 bytes left in the group. Therefore, the LASTFLAG is set to '0° (FALSE), and control is returned to the caller. The parameter ITEMCOUNT is set to 1, and REQTID is assigned the current TID (i.e., 3).

At this point return is made to the calling application to process the decoded occurrence of template J(1). Since LASTFLAG is FALSE, the application eventually issues another call to GDPDECOD to decode the fourth template occurrence (J(2)).

1. The steps for processing descriptors IDT1450 and and IDT1454 similar to the previous instance (J(1)). After IDT1454, CURDES=1436.

2. The repeating group termination condition is computed as in the previous case; this time, however, a value of TRUE results, because the accumulated processed byte count (9) equals the pre-computed group length. Any necessary end-group processing is performed, such as checking the repetition limits, the stack is popped, and the LASTFLAG is set to '1' (TRUE). Upon detecting that CURDES now references the "end descriptor" (EDT1460), the return code is set to "DECODING_COMPLETE" and control is returned to the caller.

The caller determines that the last occurrence of template J has been decoded and that decoding is complete.

Figure 21:
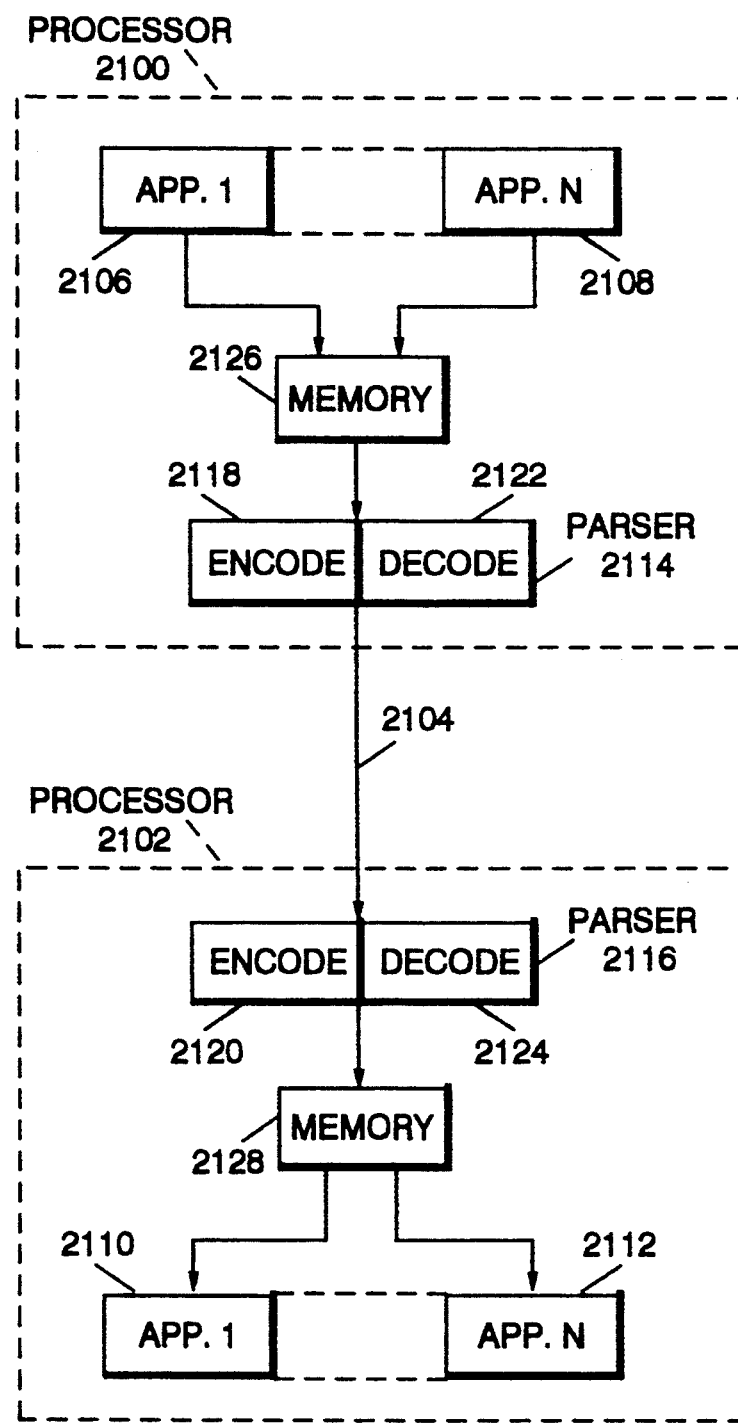

FIG. 21 is one example of a system in which the invention might be practiced. The Fig. shows separate processors 2100 and 2102, which may or may not be located at different sites of the system. The processors are connected by means of a communications channel 2104. The processors may contain a number of application programs, such as 2106, 2108 and 2110, 2112, executing at any given time. Some or all of these applications in one processor may be communicating with application programs in the other processor via the channel 2104. Such communication is performed via the common parsers 2114 and 2116 in both processors. As shown, each such parser is divided into encoding sections 2118 and 2120 and decoding sections 2122 and 2124, in accordance with the invention as described herein. Memory storage, such as 2126 in processor 2100 and 2128 in processor 2102, form part of the API between the application programs and the respective parser in a processor. In this illustrative example, this memory contains the data structure shown in FIG. 15 that in great part frees the applications from the burden of details of the data streams on the channel and the ability to easily pass information between the applications and the parser in ways convenient for the applications.

It is to be understood that the above described arrangements are merely illustrative of the application of principles of the invention and that other arrangements may be devised by workers skilled in the art without departing from the spirit and scope of the invention.

I claim:

1. In a data processing system including at least one processing node with a data communications channel, a computer implemented method of parsing data in a data stream incoming on the channel and communicating the data to a program executing on the node, said data stream having one of a plurality of different formats, comprising the computer implemented steps of:

initializing this instance of communication between a parser and the program, said initialing including identifying a parse table among a plurality of parse tables, each of said parse tables containing linked data descriptors which define the order of occurrence of individual data items within the data stream, thereby defining the format of the data stream, identifying one or more templates each of which corresponds to one or more said data items and allocating private storage for individual items, wherein said template defines storage locations in the private storage for passing the data items with which it is associated between the program and the parser and thereafter by the program, requesting a templates worth of data received by the parser on the channel from the data stream by issuing a call to the parser identifying the parse table, the state of encoding or decoding of the data stream by the parse table defining the next template to be used, by the parser, decoding the incoming data in accordance with the format of the data stream as indicated by the identified parse table to extract the individual data items, by repetitively interpreting the descriptors of the parse table in synchronization with the incoming data stream, and storing the individual data items in their respective allocated storage areas for the program.

2. The method of claim 1 further including the steps of parsing data from the program for transmission to the channel, said parsing including by the program, storing a templates worth of data items in their respective allocated storage areas, and issuing a call to the parser identifying the parse table.

3. The method of claim 2 wherein the data descriptors further define the length of the individual data items.

4. The method of claim 2 wherein the data descriptors and information in the data stream further define the length of the individual data items.

5. The method of claim 1 or claim 2 wherein the interface between a said program and the parser includes a data structure which in conjunction with the parse table points to the private storage for the individual data items.

6. The method of claim 5 wherein the data descriptors include data group descriptors and data item descriptors, wherein each group descriptor defines a subset of one or more other group or item descriptors, each said group descriptor containing a group descriptor type identification describing prescribed characteristics common to and necessary for encoding and decoding the data items identified by the item descriptors contained within the group descriptor and each said item descriptor containing an item descriptor type identification describing prescribed characteristics necessary for encoding and decoding of the data item it represents.

7. The method of claim 6 wherein the data structure further comprises a plurality of item vectors, each item vector being associated with a template, each item vector containing a pointer to the private storage allocated for each data item defined in the associated template and each item vector being used for passing a templates work of data between the program and the parser.

* * * * *